(12) United States Patent
Zeng

(10) Patent No.: US 12,523,909 B2
(45) Date of Patent: Jan. 13, 2026

(54) DISPLAY MODULE WITH HOUSING AND FLEXIBLE CIRCUIT BOARD CONNECTED TO A CONTROL CIRCUIT BOARD

(71) Applicant: Jiangsu Tianhua Automotive Electronics Co., Ltd., Jiangsu (CN)

(72) Inventor: Donglong Zeng, Nantong (CN)

(73) Assignee: Jiangsu Tianhua Automotive Electronics Co., Ltd., Nantong (CN)

( * ) Notice: Subject to any disclaimer, the term of this patent is extended or adjusted under 35 U.S.C. 154(b) by 0 days.

(21) Appl. No.: 18/908,857

(22) Filed: Oct. 8, 2024

(65) Prior Publication Data

US 2025/0028209 A1    Jan. 23, 2025

(30) Foreign Application Priority Data

Dec. 26, 2023  (CN) .......................... 202311817021.8

(51) Int. Cl.
   *G02F 1/1345*    (2006.01)
   *G02F 1/1333*    (2006.01)

(52) U.S. Cl.
   CPC .... *G02F 1/13452* (2013.01); *G02F 1/133385* (2013.01)

(58) Field of Classification Search
   CPC ........... G02F 1/13452; G02F 1/133308; G02F 1/133314
   USPC ......................................... 362/612, 632–634
   See application file for complete search history.

(56) References Cited

U.S. PATENT DOCUMENTS

| | | | | |
|---|---|---|---|---|
| 6,639,636 | B2* | 10/2003 | Yoo .................... | G02F 1/133608 349/67 |
| 8,421,950 | B2* | 4/2013 | Kim ..................... | G02B 6/0093 361/679.01 |
| 9,532,491 | B2* | 12/2016 | Hashido ................. | H05K 1/028 |
| 2006/0152664 | A1* | 7/2006 | Nishio ................ | G02F 1/13452 349/150 |
| 2007/0290985 | A1* | 12/2007 | Matsumoto ............. | G02F 1/135 349/61 |

FOREIGN PATENT DOCUMENTS

| | | |
|---|---|---|
| CN | 202018554 U | 10/2011 |
| CN | 217718658 U | 11/2022 |
| CN | 217821187 U | 11/2022 |

\* cited by examiner

*Primary Examiner* — Robert J May
(74) *Attorney, Agent, or Firm* — Wiersch Law Group

(57) ABSTRACT

A display module, manufacturing method of display module, and terminal are provided. Display module includes housing, display panel in housing, cover plate located at side of light-emitting surface of display panel, flexible circuit board, and driving circuit board. Housing includes backplane and side plate. Backplane and side plate define space for accommodating display panel. End of flexible circuit board is electrically connected to display panel. Driving circuit board is located at side of backplane away from display panel. Backplane includes hollow located at side of side plate adjacent to display panel. Flexible circuit board passes through hollow and is electrically connected to driving circuit board. Cover plate is connected to side plate through connection portion. Manufacturing method of display module is used to manufacture foregoing display module. Terminal includes foregoing display module. Present disclosure can ensure assembly efficiency and display quality and improve waterproof and dustproof performance of module.

20 Claims, 24 Drawing Sheets

DISPLAY MODULE WITH HOUSING AND FLEXIBLE CIRCUIT BOARD CONNECTED TO A CONTROL CIRCUIT BOARD

CROSS-REFERENCE TO RELATED DISCLOSURE

The present disclosure claims priority to Chinese Patent Disclosure No. 202311817021.8, filed on Dec. 26, 2023, the content of which is incorporated herein by reference in its entirety.

TECHNICAL FIELD

The present disclosure relates to the field of display technologies, and more specifically, to a display module, a manufacturing method of a display module, and a display device.

BACKGROUND

As display panel technology and an automobile technology develop, in-vehicle display modules are widely used in the automobile field, imposing increasingly high requirements for reliability of in-vehicle display modules. Existing display modules on the market are mainly formed by assembling a touch screen, a backlight module, and a rear housing, or by assembling a display screen and a rear housing.

However, in an existing module, gaps are usually formed at positions where components are assembled in pairs, resulting in poor waterproof and dustproof performance. In addition, the interior of the module is vulnerable to impact of water vapor and other moisture, causing a short circuit of the module structure. That is, the existing module is prone to water or dust ingress after assembly, which is difficult to clean and can cause damage to a product and shorten a service life of the product in severe cases. At present, a process requirement needs to be met through gap control during production, which greatly increases costs. In addition, production fluctuation is large. There is a risk of large gaps and susceptibility to quality hazards over time.

Therefore, it is an urgent technical problem to be resolved by those skilled in the art to provide a display module that can ensure assembly efficiency and display quality and improve waterproof and dustproof performance of the module, a manufacturing method of a display module, and a terminal.

SUMMARY

In view of this, the present disclosure provides a display module, a manufacturing method of a display module, and a terminal to resolve problems in the related art that an assembled module structure has poor waterproof and dustproof performance, is prone to high manufacturing costs, and has impact on production efficiency and display quality.

The present disclosure provides a display module, including a housing, a display panel located in the housing, a cover plate located at a side of a light-emitting surface of the display panel, at least one flexible circuit board, and a driving circuit board. The housing includes a backplane and a side plate. The backplane and the side plate form a space for accommodating the display panel. An end of the flexible circuit board is electrically connected to the display panel. The driving circuit board is located at a side of the backplane away from the display panel. The backplane includes at least one hollow. The hollow is located at a side of the side plate adjacent to the display panel. The flexible circuit board passes through the hollow and is electrically connected to the driving circuit board. The cover plate is connected to the side plate through a connection portion.

Based on the same inventive concept, the present disclosure further provides a manufacturing method of a display module, including: providing a display panel and a cover plate, where the display panel is electrically connected to a flexible circuit board; bonding the cover plate to a side of a light-emitting surface of the display panel; providing a housing, where the housing includes a backplane and a side plate, the backplane and the side plate form a space for accommodating the display panel, and the backplane includes at least one hollow; disposing a connection portion around the side plate; assembling the display panel and the cover plate that are bonded and the housing such that a periphery of the cover plate is connected to the side plate through the connection portion, and at least a part of the flexible circuit board passes through the hollow, where after the display panel and the cover plate that are bonded and the housing are assembled, the hollow is located at a side of the side plate adjacent to the display panel; and disposing a driving circuit board at a side of the backplane away from the display panel, and electrically connecting an end of the flexible circuit board passing through the hollow to the driving circuit board.

Based on the same inventive concept, the present disclosure further provides a terminal, including the foregoing display module.

BRIEF DESCRIPTION OF DRAWINGS

The accompanying drawings, which are incorporated in and constitute a part of the specification, illustrate embodiments of the present disclosure and together with the general description, serve to explain the principles of the present disclosure.

DESCRIPTION OF EMBODIMENTS

Figure 1:
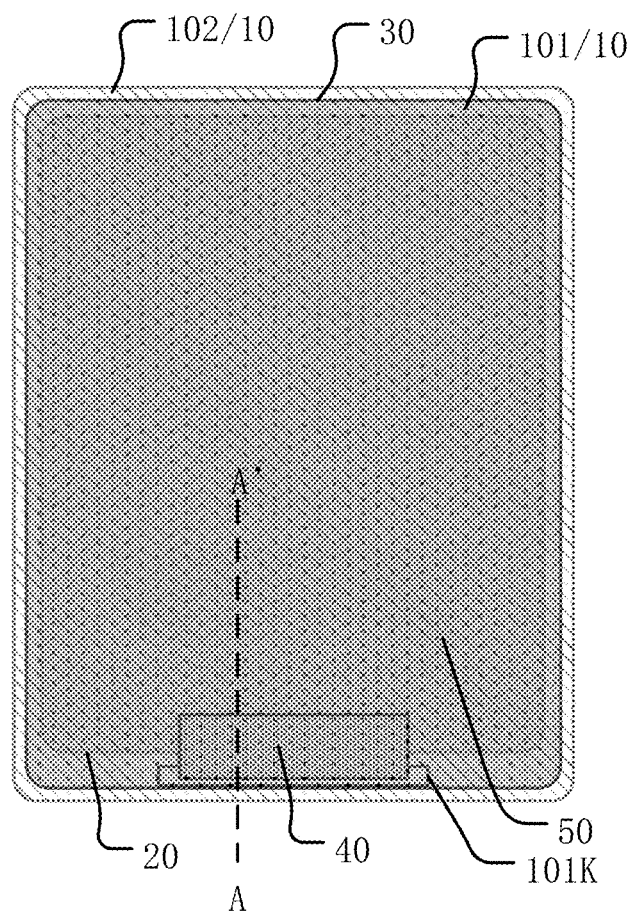
FIG. 1 is a schematic planar structural diagram of a display module according to an embodiment of the present disclosure.

Exemplary embodiments of the present disclosure are described in detail below with reference to the accompanying drawings. It should be noted that unless otherwise specified, the relative arrangement, numerical expressions, and numerical values of components and steps set forth in these embodiments do not limit the scope of the present disclosure.

The following description of at least one exemplary embodiment is merely illustrative, and not intended to limit the present disclosure and application or use thereof in any way.

The technologies, methods, and devices known to those of ordinary skill in the art may not be discussed in detail, but where appropriate, the technologies, methods, and devices should be regarded as part of the specification.

In all examples shown and discussed herein, any specific value should be interpreted as merely exemplary, rather than restrictive. Therefore, other examples of the exemplary embodiments may have different values.

It is obvious for those skilled in the art that various modifications and changes may be made to the present disclosure without departing from the spirit or scope of the present disclosure. Therefore, the present disclosure is intended to cover the modifications and changes to the present disclosure that fall within the range of the corresponding claims (technical solutions claimed) and equivalents thereof. It should be noted that the implementations provided in the embodiments of the present disclosure can be combined with each other if no conflict occurs.

It should be noted that similar reference numerals and letters represent similar items in the accompanying drawings below. Therefore, once an item is defined in one accompanying drawing, it does not need to be further discussed in subsequent accompanying drawings.

Figure 2:
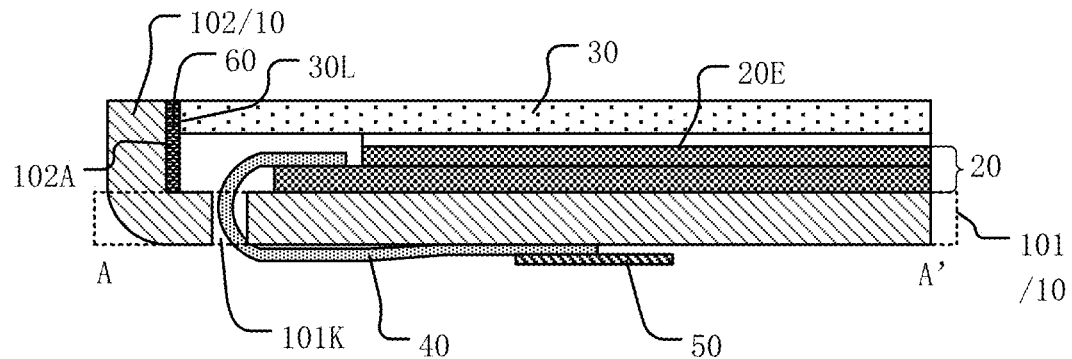
FIG. 2 is a schematic structural diagram of a cross section taken along A-A' in FIG. 1.

As shown in FIG. 1 and FIG. 2. FIG. 1 is a schematic planar structural diagram of a display module according to an embodiment of the present disclosure. FIG. 2 is a schematic structural diagram of a cross section taken along A-A' in FIG. 1. (It can be understood that FIG. 1 is filled with transparency to clearly illustrate a structure in this embodiment.) A display module 000 provided in this embodiment includes a housing 10, a display panel 20 located in the housing 10, and a cover plate 30 located at a side of a light-emitting surface 20E of the display panel 20.

The housing 10 includes a backplane 101 and a side plate 102. (It can be understood that because the backplane 101 and the side plate 102 both belong to the housing 10, they are illustrated with a same filling pattern in the figure.) The backplane 101 and the side plate 102 form a space for accommodating the display panel 20.

The display module further includes at least one flexible circuit board 40. An end of the flexible circuit board 40 is electrically connected to the display panel 20.

The display module further includes a driving circuit board 50. The driving circuit board 50 is located at a side of the backplane 101 away from the display panel 20.

The backplane 101 includes at least one hollow 101K. The hollow 101K is located at a side of the side plate 102 adjacent to the display panel 20.

The flexible circuit board 40 passes through the hollow 101K. In addition, the flexible circuit board 40 is electrically connected to the driving circuit board 50. The cover plate 30 is connected to the side plate 102 through a connection portion 60.

Specifically, the display module 000 in this embodiment includes the housing 10, the display panel 20 located in the housing 10, and the cover plate 30 located at the side of the light-emitting surface 20E of the display panel 20. The light-emitting surface 20E of the display panel 20 may be understood as a side surface of the display panel 20 displaying an image. The cover plate 30 is disposed at the side of the light-emitting surface 20E of the display panel 20. In some embodiments, a size of the cover plate 30 is usually larger than that of the display panel 20, to well protect the entire display panel 20. The housing 10 in this embodiment is configured to accommodate at least the display panel 20. The housing 10 includes the backplane 101 and the side plate 102. The side plate 102 may be an integral structure itself disposed around the backplane 101 at an edge of the backplane 102 or an integral structure formed by connecting a plurality of independent structures and disposed around the backplane 101 at the edge of the backplane 102 such that the backplane 101 and the side plate 102 form the space for accommodating at least the display panel 20. Preferably, the side plate 102 in this embodiment may be an integral structure itself disposed around the backplane 101 at the edge of the backplane 102 such that in the housing 10 formed by the structure of the side plate 102, a possibility that the side plate 102 has an assembling gap can be reduced. This helps better improve a sealing effect of the housing 10. It should be noted that because the backplane 101 and the side plate 102 both belong to the housing 10, they are illustrated with the same filling pattern in the figure in this embodiment. The backplane 101 may be understood as being parallel or basically parallel to a plane of the display panel 20. An overall extension direction of the side plate 102 is nearly perpendicular or perpendicular to a plane of the backplane 101, to form a structure of the housing 10 in this embodiment. It can be understood that the cover plate 30 included in the display module 000 in this embodiment may be located in the accommodating space formed by the backplane 101 and the side plate 102, to protect both the display panel 20 and the cover plate 30 through the housing 10. Alternatively, the cover plate 30 may be located outside the accommodating space formed by the backplane 101 and the side plate 102. For example, the cover plate 30 is lapped on the side plate 102. Details have been set forth in the description of subsequent embodiments, which are not described in this embodiment.

The display module 000 includes at least one flexible circuit board 40. The end of the flexible circuit board 40 is electrically connected to the display panel 20. The flexible circuit board 40 may be electrically connected to the display panel 20 directly. Alternatively, the flexible circuit board 40 may be electrically connected to the display panel 20 through another structure, such as a circuit board structure. This is not limited in this embodiment. In specific implementation, this may be set based on a type of the display panel 20. Specifically, the display panel 20 in this embodiment may be a liquid crystal display panel. In this case, the flexible circuit board 40 may be a flexible circuit board that provides a drive signal for an array substrate and/or a color filter substrate included in the display panel 20. A non-display region of the array substrate in the display panel 20 may be bound to a circuit board structure, and electrically connected to the flexible circuit board 40 through the circuit board structure in the non-display region, to provide a drive signal for the display panel 20 through the flexible circuit board 40. Alternatively, the flexible circuit board 40 may be a flexible circuit board that provides a drive signal for a backlight module included in the display panel 20. A backlight source in the backlight module included in the display panel 20 may be electrically connected to the flexible circuit board 40, to provide, through the flexible circuit board 40, a signal for driving the backlight source to emit light. Alternatively, the display panel 20 in this embodiment may be an organic light-emitting diode (OLED) display panel, a micro light-emitting diode (LED) display panel, or a mini LED display panel. In this case, the flexible circuit board 40 may be directly bound to a non-display region of the display panel 20 to provide a drive signal for the display panel.

The display module 000 in this embodiment further includes the driving circuit board 50. The driving circuit board 50 is located at the side of the backplane 101 away from the display panel 20. The driving circuit board 50 is electrically connected to the flexible circuit board 40. The driving circuit board 50 provides a signal such as power for the flexible circuit board 40 to drive the display panel 20.

For example, the display panel is a liquid crystal display panel. In the prior art, when the display module is assembled, a die-casting fitting of the backlight module, the display panel including the backlight module, and a rear housing are assembled in pairs. The whole display module is formed through clearance fit. The die-casting fitting of the backlight module or the rear housing needs to have a gap for the flexible circuit board to be folded back to the outside of the rear housing and electrically connected to the driving circuit board. Therefore, assembly positions are prone to gaps after assembly in pairs. This results in poor waterproof and dustproof performance and shortens a service life of a product.

To resolve the foregoing problems, the backplane 101 in this embodiment includes at least one hollow 101K. The hollow 101K is located at the side of the side plate 102 adjacent to the display panel 20. The hollow 101K may have a position corresponding to a position of the flexible circuit board 40, and is for the flexible circuit board 40 to pass through. The flexible circuit board 40 passes through the hollow 101K and then is electrically connected to the driving circuit board 50 at the side of the backplane 101 away from the display panel 20, to drive the display panel 20. In the display module 000 provided in this embodiment, original structures of the die-casting fitting of the backlight module and the rear housing are designed into a whole. An assembling gap of an existing design is resolved through improvement. The hollow 101K is provided only at a position through which the flexible circuit board 40 needs to pass. The side plate 102 is disposed around the backplane 101 of the housing 10 to serve as a retaining wall. A lower end of the side plate 102 is integrally connected to a periphery of the backplane 101 to jointly carry the display panel 20. This can reduce a possibility of an assembling gap after module assembly. In addition, the cover plate 30 is connected to the side plate 102 through the connection portion 60 in this embodiment. The connection portion 60 is disposed such that the cover plate 30 and the display panel 20 are wrapped with the side plate 102, to form an enclosed space without a gap around. An integral sealing assembly effect is achieved on an entire surface, to meet overall waterproof and dustproof performance requirements of the display module 000. A design of the housing 10 in this embodiment can achieve high sealing performance and good waterproof and dustproof effects. In addition, an assembly process is simple and fast. After the display panel 20 is bonded to the cover plate 30, the flexible circuit board 40 only needs to pass through the hollow 101K of the backplane 101 to be electrically connected to the driving circuit board 50. This can improve assembly efficiency and reduce manufacturing costs.

In some embodiments, the driving circuit board 50 included in the display module 000 in this embodiment is disposed at the side of the backplane 101 away from the display panel 20. The flexible circuit board 40 passes through the hollow 101K of the backplane 101 and then is electrically connected to the driving circuit board 50. The flexible circuit board 40 may be electrically connected to the driving circuit board 50 directly. Alternatively, the flexible circuit board 40 may be electrically connected through a connection structure such as a connector. This is not limited in this embodiment. In specific implementation, this may be set based on an actual requirement.

In some embodiments, the cover plate 30 is connected to the side plate 102 through the connection portion 60 in this embodiment. The connection portion 60 is disposed such that the cover plate 30 and the display panel 20 are wrapped with the side plate 102, to form an enclosed space. When the cover plate 30 is connected to the side plate 102, a portion of the cover plate 30 extending beyond the display panel 20 may be connected to the side plate 102 through the connection portion 60. Alternatively, an edge of the cover plate 30 may be connected to the side plate 102 through the connection portion 60. This is not limited in this embodiment. A structure and material of the connection portion 60 are not limited in this embodiment. The connection portion 60 may be dispensing adhesive, double-sided adhesive, or other adhesive having a sealing and fastening effect. This is not limited in this embodiment.

It should be understood that a quantity, size, shape, and the like of the hollow 101K in the backplane 101 are not specifically limited in this embodiment, provided that the flexible circuit board 40 can pass through the hollow 101K. In specific implementation, the quantity of hollows 101K included in the backplane 101 may not be limited to one, but may be a plurality, and may be specifically set based on an actual requirement of the display module.

It should be noted that the accompanying drawings in this embodiment merely use an example in which the display panel 20 is a liquid crystal display panel. In specific implementation, the display panel 20 may alternatively be an OLED display panel or the like. In this case, the flexible circuit board may be directly bound to the non-display region of the display panel. The figures in this embodiment merely show an exemplary structure of the display panel 20 in the display module 000. In specific implementation, the structure of the display panel 20 includes, but is not limited to, specific structures of the array substrate and the color filter substrate, and may further include other structures capable of implementing a display function, such as a touch function structure and a polarizer. This can be specifically understood by referring to a structure of a display panel in the related art based on the type of the display panel.

In some embodiments, the driving circuit board 50 in this embodiment is disposed at the side of the backplane 101 away from the display panel 20. The driving circuit board 50 may be parallel to the plane of the backplane 101 (as shown in FIG. 2) and bonded to the backplane 101. Alternatively, the driving circuit board 50 may not be parallel to the plane of the backplane 101 (not shown). For example, the driving circuit board 50 may be perpendicular to the plane of the backplane 101. The driving circuit board 50 may also be fastened to the side of the backplane 101 away from the display panel 20. This is not limited in this embodiment.

Figure 3:
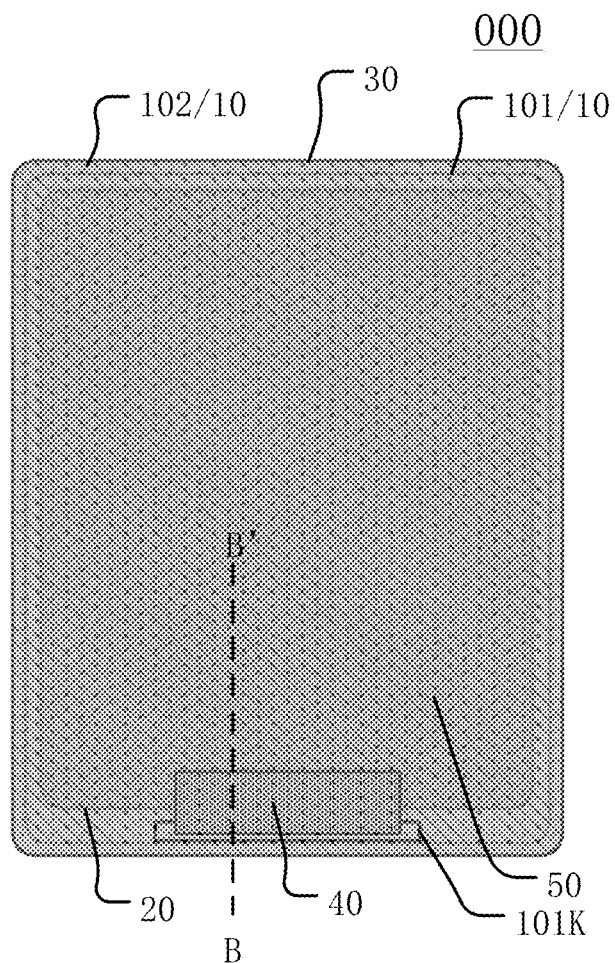
FIG. 3 is another schematic planar structural diagram of a display module according to an embodiment of the present disclosure.
Figure 4:
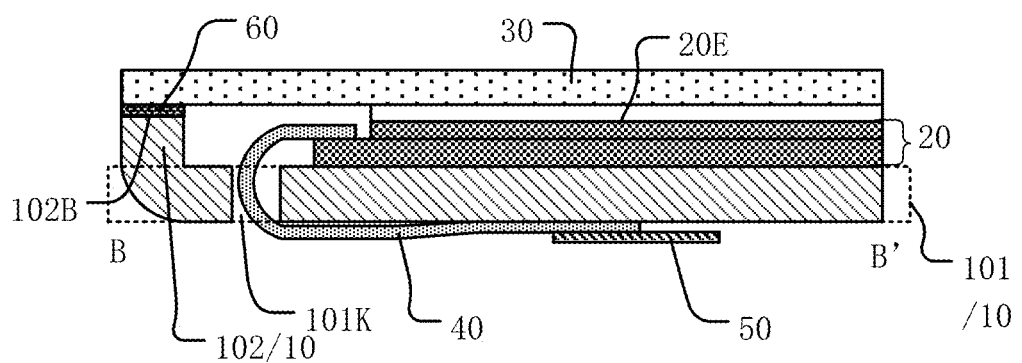
FIG. 4 is a schematic structural diagram of a cross section taken along B-B' in FIG. 3.

In some embodiments, as shown in FIG. 1 and FIG. 2, the cover plate 30 is connected to the side plate 102 through the connection portion 60 in this embodiment. When the cover plate 30 is connected to the side plate 102, the cover plate 30 and the display panel 20 may both be located in the space formed by the side plate 102 and the backplane 101. An edge 30L of the cover plate 30 is connected to a side surface 102A of the side plate 102 facing the display panel 20 through the connection portion 60. FIG. 3 is another schematic planar structural diagram of a display module according to an embodiment of the present disclosure. FIG. 4 is a schematic structural diagram of a cross section taken along B-B' in FIG. 3. (It can be understood that FIG. 3 is filled with transparency to clearly illustrate a structure in this embodiment.) Alternatively, as shown in FIG. 3 and FIG. 4, the display panel 20 may be located in the space formed by the side plate 102 and the backplane 101, and the cover plate 30 may be located outside the space formed by the side plate 102 and the backplane 101. The portion of the cover plate 30 extending beyond the display panel 20 may be connected to a top portion 102B of the side plate 102 through the connection portion 60. (For example, when the display panel 20 includes a plurality of sub-panels for a splicing screen, the cover plate 30 has a large block structure, and the cover plate 30 is lapped on the top portion of the side plate 102.) This is not limited in this embodiment. In specific implementation, this may be set based on a specific structure of the display module 000.

In some embodiments, the housing 10 of the display module 000 includes the backplane 101 and the side plate 102. In this embodiment, the backplane 101 and the side plate 102 are integrally formed. The integrally formed backplane 101 and side plate 102 can not only improve process efficiency of the housing 10, but also help reduce an assembling gap of the housing 10, and help improve an integral sealing effect of the assembled display module 000 when the housing 10 is assembled with the display panel 20 and the cover plate 30.

Figure 5:
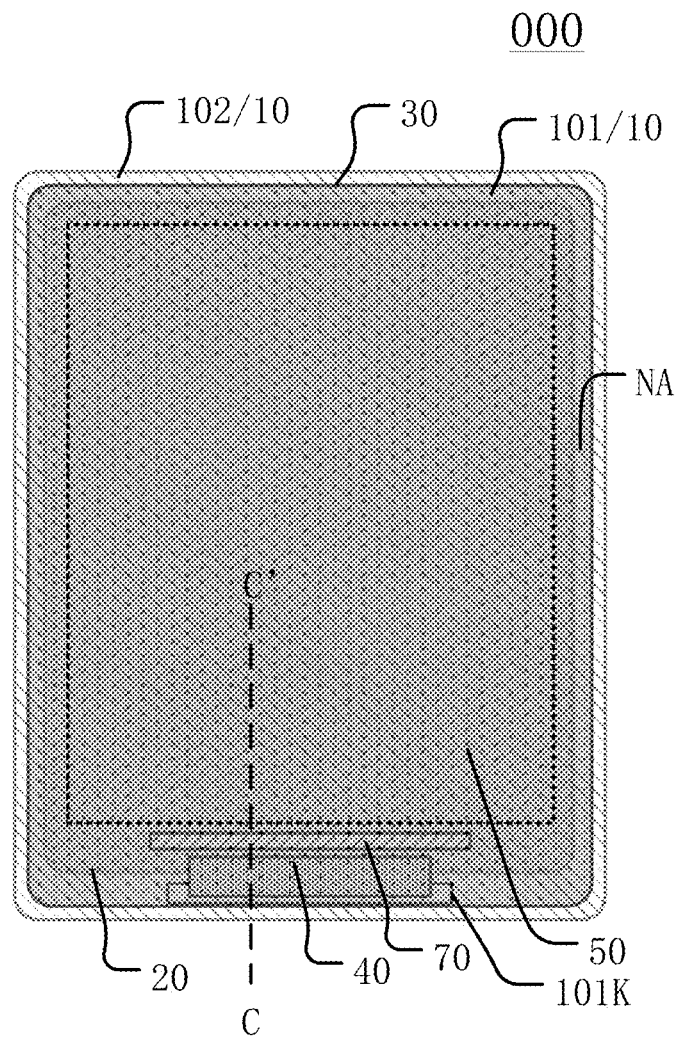
FIG. 5 is another schematic planar structural diagram of a display module according to an embodiment of the present disclosure.
Figure 6:
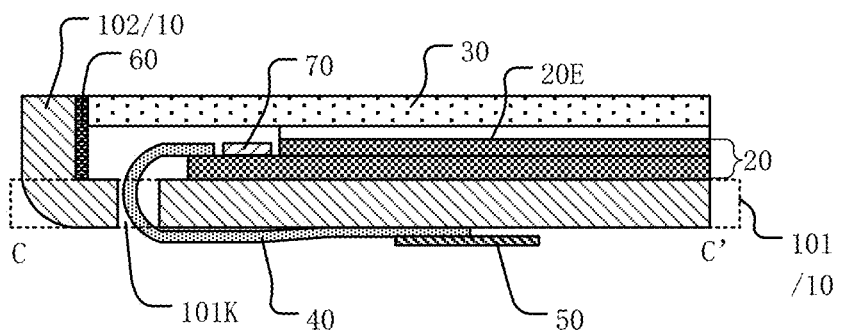
FIG. 6 is a schematic structural diagram of a cross section taken along C-C' in FIG. 5.

In some optional embodiments, as shown in FIG. 5 and FIG. 6. FIG. 5 is another schematic planar structural diagram of a display module according to an embodiment of the present disclosure. FIG. 6 is a schematic structural diagram of a cross section taken along C-C' in FIG. 5. (It can be understood that FIG. 5 is filled with transparency to clearly illustrate a structure in this embodiment.) In this embodiment, the flexible circuit board 40 is electrically connected to the display panel 20 through a first circuit board 70. The first circuit board 70 is located in a non-display region NA of the display panel 20.

Orthographic projection of the hollow 101K on the plane of the display panel 20 is located between orthographic projection of the side plate 102 on the plane of the display panel 20 and orthographic projection of the first circuit board 70 on the plane of the display panel 20.

This embodiment explains that the flexible circuit board 40 may be electrically connected to the display panel 20 through the first circuit board 70 bound to the non-display region NA of the display panel 20. The first circuit board 70 may be a driver integrated circuit (IC). For example, the display panel 20 is a liquid crystal display panel. In addition to the backlight module, the display panel 20 further includes a liquid crystal panel composed of an array substrate and a color filter substrate. The flexible circuit board 40 may be a circuit board configured to drive the liquid crystal panel to operate. The first circuit board 70 may be bound to a step binding position of the array substrate beyond the color filter substrate. The flexible circuit board 40 is electrically connected to the display panel 20 through the first circuit board 70. That is, a packaging technology of the display panel 20 is a chip on glass (COG) packaging technology. In some embodiments, the first circuit board 70 may be bound to the array substrate through an anisotropic conductive film (ACF), to transmit a drive signal among the flexible circuit board 40, the first circuit board 70, and the display panel 20 to light up the screen. The display module using the COG packaging technology can be thin and have high reliability and proper cost advantages.

When the display module 000 includes the first circuit board 70, in the assembled display module 000, the orthographic projection of the hollow 101K of the backplane 101 on the plane of the display panel 20 is located between the orthographic projection of the side plate 102 on the plane of the display panel 20 and the orthographic projection of the first circuit board 70 on the plane of the display panel 20. That is, the hollow 101K is closer to the side plate 102 than the first circuit board 70. In this way, after one end of the flexible circuit board 40 is electrically connected to the first circuit board 70 in the non-display region NA of the display panel 20, a side adjacent to the side plate 102 bends and passes through the hollow 101K located between the side plate 102 and the first circuit board 70. The other end of the flexible circuit board 40 is electrically connected to the driving circuit board 50. Finally, the driving circuit board 50 provides a drive signal for the entire display module 000.

It can be understood that in this embodiment, an example in which the display panel 20 is a liquid crystal display panel is used to schematically illustrate a positional relationship among the hollow 101K of the backplane 101, the side plate 102, and the first circuit board 70. In specific implementation, the display panel 20 may be another type of display panel. For example, when the first circuit board is not disposed in the non-display region of the display panel 20, but the flexible circuit board 40 is directly bound to the non-display region NA of the display panel 20, and the first circuit board is bound and electrically connected to the flexible circuit board 40, and then bends to a side of a backlight surface of the display panel 20 together with the flexible circuit board 40, the hollow 101K of the backplane 101 only needs to be as adjacent to the side plate 102 as possible. This helps make a binding position of the flexible circuit board 40 and the display panel 20 as close as possible to an edge of the display module 000, to avoid occupying a space of a display region and ensure a design effect of a narrow frame.

Figure 7:
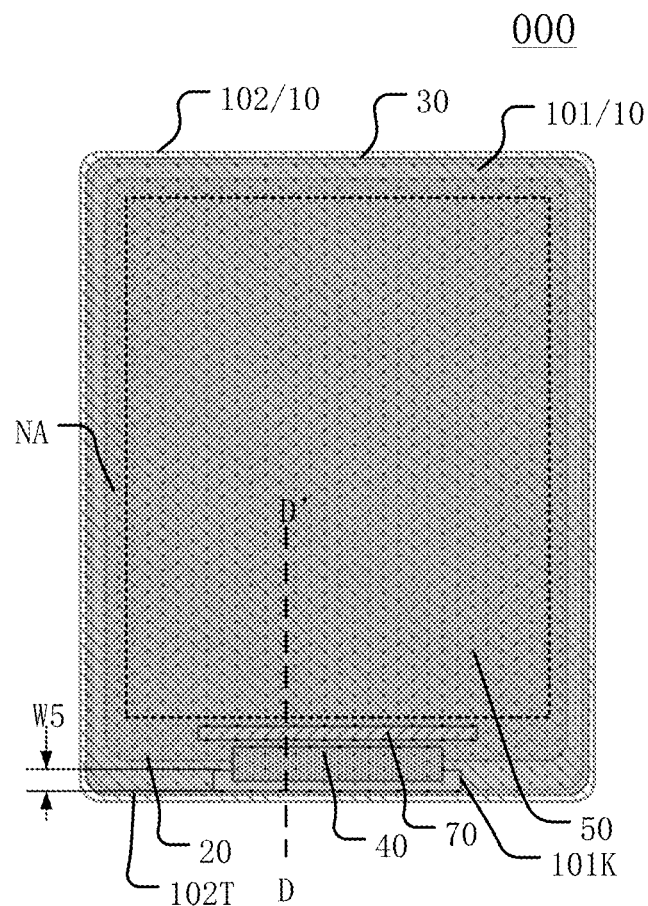
FIG. 7 is another schematic planar structural diagram of a display module according to an embodiment of the present disclosure.
Figure 8:
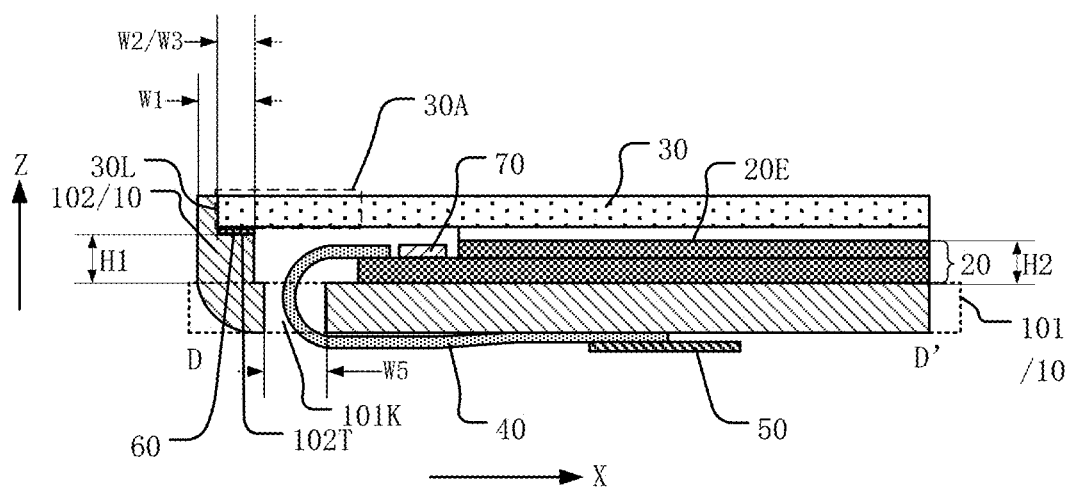
FIG. 8 is a schematic structural diagram of a cross section taken along D-D' in FIG. 7.

In some optional embodiments, as shown in FIG. 7 and FIG. 8. FIG. 7 is another schematic planar structural diagram of a display module according to an embodiment of the present disclosure. FIG. 8 is a schematic structural diagram of a cross section taken along D-D' in FIG. 7. (It can be understood that FIG. 7 is filled with transparency to clearly illustrate a structure in this embodiment.) In this embodiment, an end of the side plate 102 away from the backplane 101 includes a step portion 102T. The cover plate 30 includes a first portion 30A extending beyond the display panel 20.

At least a part of the first portion 30A overlaps the step portion 102T.

This embodiment explains that the side plate 102 and the backplane 101 of the housing 10 may form the space for accommodating the display panel 20 and the cover plate 30. That is, the cover plate 30 may also be disposed in the space formed by the housing 10. The end of the side plate 102 away from the backplane 101 (which may be understood as the top portion of the side plate 102) is provided with the step portion 102T. In some embodiments, part of a surface of the end of the side plate 102 away from the backplane 101 is recessed toward the backplane 101 to form the step portion 102T. This can also be understood as that a partial region of the end of the side plate 102 away from the backplane 101 is hollowed out to form the step portion 102T (as shown in FIG. 8). When the cover plate 30 is connected to the side plate 102, the first portion 30A of the cover plate 30 extending beyond the display panel 20 may be lapped on the step portion 102T of the side plate 102. That is, at least a part of the first portion 30A overlaps the step portion 102T. The step portion 102T can carry and support the cover plate 30. This helps improve stability of the display module. In addition, when the cover plate 30 is connected to the side plate 102, a sealing connection effect between the cover plate 30 and the side plate 102 can be achieved through the connection portion 60 disposed on the step portion 102T. This helps improve overall waterproof and dustproof performance of the display module.

It can be understood that in this embodiment, the end of the side plate 102 away from the backplane 101 includes the step portion 102T. The part of the surface of the end of the side plate 102 away from the backplane 101 is recessed toward the backplane 101 to form the step portion 102T. In a direction X from the side plate 102 to the display panel 20, a thickness W1 of the side plate 102 is greater than a width W2 of the step portion 102T (as shown in FIG. 8). This helps ensure that at least a part of the first portion 30A can be lapped on the step portion 102T, and the edge 30L of the cover plate 30 can be wrapped with the other portion of the side plate 102, to enhance a protection effect of the housing 10 on the display panel 20 and the cover plate 30.

In some embodiments, as shown in FIG. 7 and FIG. 8, the width W2 of the step portion 102T is greater than or equal to 1.8 mm in the direction X from the side plate 102 to the display panel 20 (it should be noted that the direction X from the side plate 102 to the display panel 20 in this embodiment may be understood as a direction parallel to a direction from the side plate 102 to the display panel 20 on the plane of the display panel 20). During reliability verification of the display module, in the display module 000 provided in this embodiment, the width W2 of the step portion 102T of the side plate 102 is greater than or equal to 1.8 mm. This can meet a carrying capacity requirement when the cover plate 30 is lapped on the step portion 102T, and ensure that a space for disposing the connection portion 60 is large enough when the connection portion 60 is disposed on the step portion 102T to connect the cover plate 30 and the side plate 102, to improve stability of the connection between the cover plate 30 and the side plate 102.

In some embodiments, as shown in FIG. 7 and FIG. 8, the connection portion 60 in this embodiment includes an adhesive layer. The step portion 102T is coated with the adhesive layer. The first portion 30A is connected to the step portion 102T through the adhesive layer. The step portion 102T of the side plate 102 may be coated with the adhesive layer through dispensing. Alternatively, the adhesive layer may be a double-sided adhesive material bonded to the step portion 102T of the side plate 102. This is not limited in this embodiment. When the cover plate 30 is lapped on the step portion 102T, the step portion 102T is coated with the adhesive layer. When the display module is assembled, the cover plate 30 and the side plate 102 are integrally sealed. This can effectively prevent water and dust, and ensure reliability of the display module.

Figure 9:
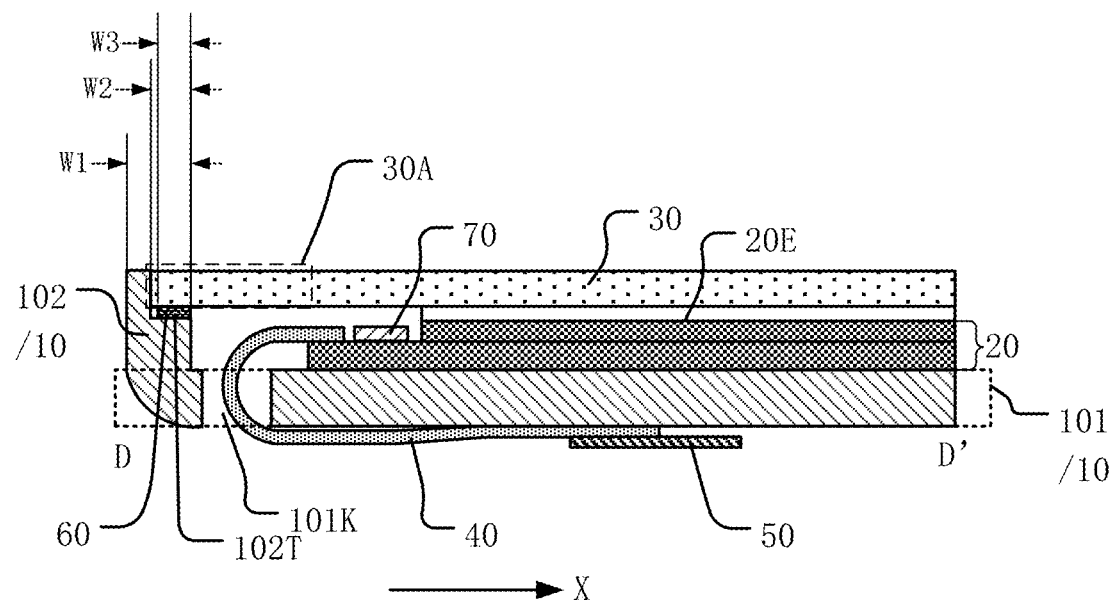
FIG. 9 is another schematic structural diagram of a cross section taken along D-D' in FIG. 7.

In some embodiments, as shown in FIG. 7, FIG. 8, and FIG. 9, FIG. 9 is another schematic structural diagram of a cross section taken along D-D' in FIG. 7. In this embodiment, the width W2 of the step portion 102T is greater than or equal to a width of the adhesive layer in the direction X from the side plate 102 to the display panel 20.

This embodiment explains that the connection portion 60 includes the adhesive layer and the step portion 102T is coated with the adhesive layer. When the cover plate 30 is lapped on the step portion 102T and the cover plate 30 is connected to the side plate 102 through the adhesive layer, the width W2 of the step portion 102T is greater than or equal to the width of the adhesive layer (namely, a width W3 of the connection portion 60, where the width W2 of the step portion 102T is equal to the width W3 of the connection portion 60 in FIG. 8, and the width W2 of the step portion 102T is greater than the width W3 of the connection portion 60 in FIG. 9). This helps ensure that the adhesive layer is within a range of the step portion 102T, and the width of the adhesive layer is large enough to improve stability and sealing performance of the connection between the cover plate 30 and the side plate 102.

Furthermore, in some embodiments, as shown in FIG. 7 to FIG. 9, in this embodiment, the width of the adhesive layer (namely, the width W3 of the connection portion 60) is greater than or equal to 1 mm in the direction X from the side plate 102 to the display panel 20.

This embodiment explains that when the step portion 102T of the side plate 102 is coated with the adhesive layer as the connection portion 60 connecting the cover plate 30 and the side plate 102, the width of the adhesive layer, namely, the width W3 of the finally formed connection portion 60, is greater than or equal to 1 mm. This can avoid affecting the stability of the connection between the cover plate 30 and the side plate 102 due to the adhesive layer being too narrow. Therefore, in this embodiment, when the width W2 of the step portion 102T of the side plate 102 is greater than or equal to 1.8 mm to improve a carrying capacity, the width of the adhesive layer with which the step portion 102T of the side plate 102 is coated is set to be greater than or equal to 1 mm. This helps improve reliability and stability between the cover plate 30 and the housing 10 after module assembly, to help improve a sealing effect after the housing 10 accommodates the cover plate 30 and the display panel 20.

Figure 10:
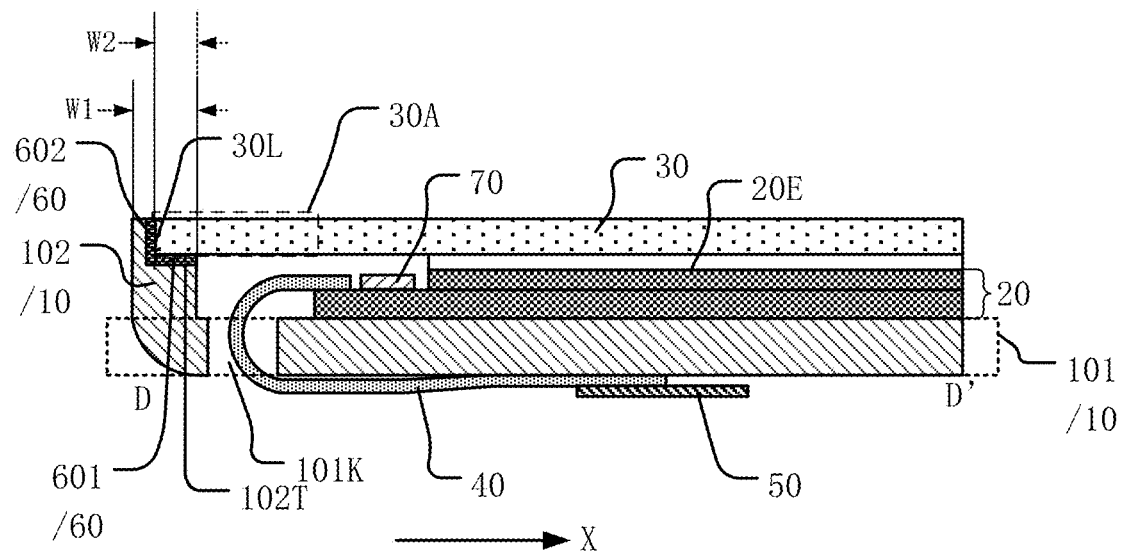
FIG. 10 is another schematic structural diagram of a cross section taken along D-D' in FIG. 7.

In some embodiments, as shown in FIG. 7 and FIG. 10, FIG. 10 is another schematic structural diagram of a cross section taken along D-D' in FIG. 7. The connection portion 60 may include not only a first connection portion 601 disposed on the step portion 102T, but also a second connection portion 602 disposed on the step portion 102T and at a side of the side plate 102 facing the display panel 20. The first connection portion 601 and the second connection portion 602 are integrally formed during coating with the adhesive layer. This can further increase a coating area of the entire connection portion 60. When the cover plate 30 is connected to the side plate 102, the bottom of the first portion 30A of the cover plate 30 is fastened to the side plate 102 through the first connection portion 601 on the step portion 102T, and the edge 30L of the cover plate 30 is connected and fastened to the side plate 102 through the second connection portion 602 at the side of the side plate 102 facing the display panel 20. This can better improve assembly stability and sealing performance of the display module.

Figure 11:
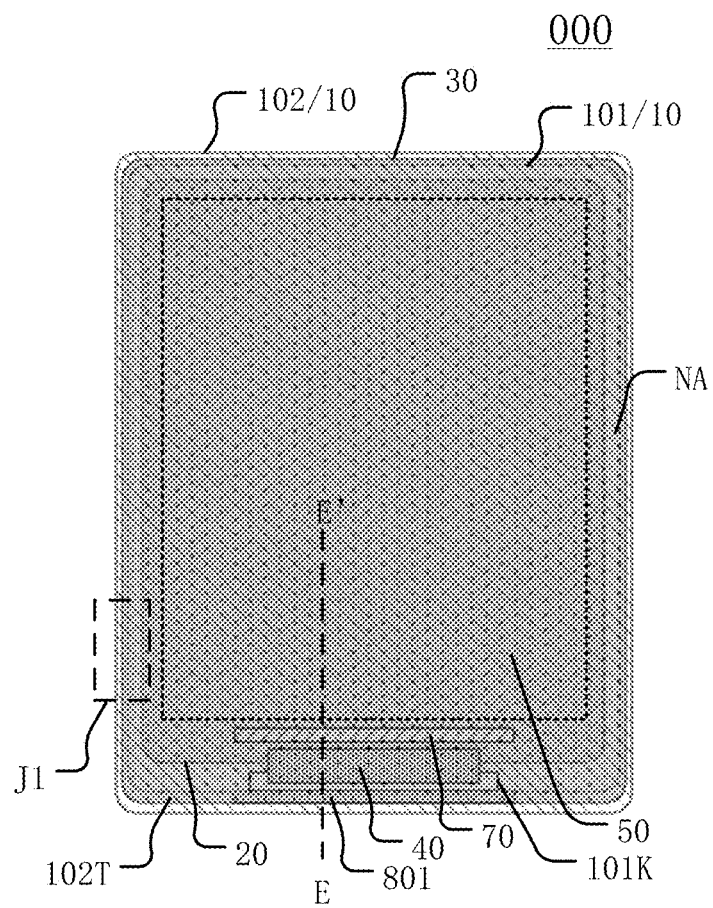
FIG. 11 is another schematic planar structural diagram of a display module according to an embodiment of the present disclosure.
Figure 12:
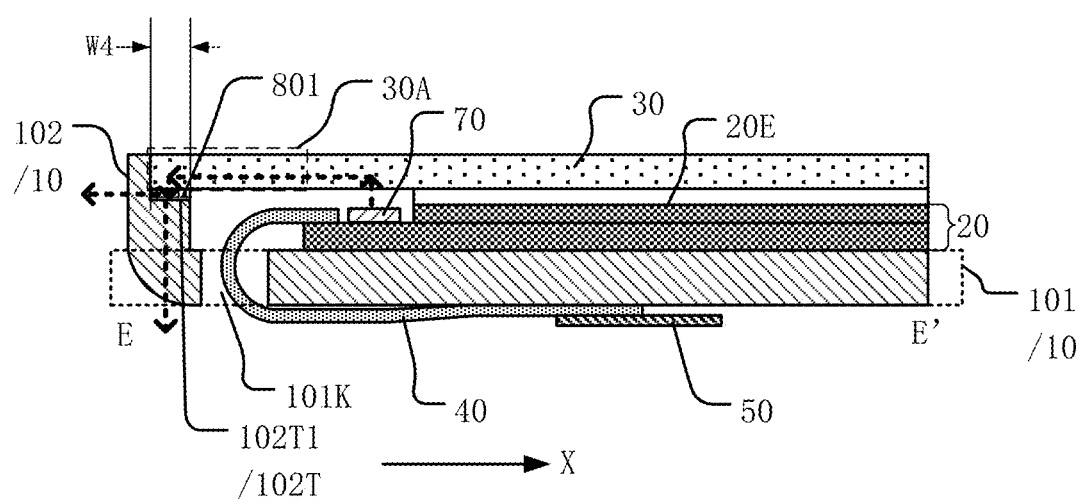
FIG. 12 is a schematic structural diagram of a cross section taken along E-E' in FIG. 11.

In some optional embodiments, as shown in FIG. 11 and FIG. 12. FIG. 11 is another schematic planar structural diagram of a display module according to an embodiment of the present disclosure. FIG. 12 is a schematic structural diagram of a cross section taken along E-E' in FIG. 11. (It can be understood that FIG. 11 is filled with transparency to clearly illustrate a structure in this embodiment.) In this embodiment, a first heat dissipation adhesive tape 801 is disposed at a side of the step portion 102T facing the first portion 30A in the hollow 101K.

This embodiment explains that the first heat dissipation adhesive tape 801 is attached to a partial region of the step portion 102T of the side plate 102. Specifically, during use of the display module, a specific position is prone to an extremely high temperature. If the display module is used for too long, an internal structure of the display module is prone to softening due to overheating, resulting in deformation. For example, the display panel 20 is a liquid crystal display panel. The first circuit board 70 is bound to the non-display region NA of the display panel 20. In the display module 000, the flexible circuit board 40 is electrically connected to the display panel 20 through the first circuit board 70. Main heat sources of the display module 000 are LEDs in the backlight source and the first circuit board 70 bound to the non-display region NA of the display panel 20. The backlight module including the backlight source is usually located at a side of the display panel 20 adjacent to the backplane 101. A part of heat generated by the backlight module is diffused toward the cover plate 30. A position of the first circuit board 70 is a region where heat is concentrated. Therefore, a temperature in the vicinity of the hollow 101K, at the position of the first circuit board 70, and at a position of the electrical connection between the flexible circuit board 40 and the first circuit board 70 and in the vicinity thereof is higher than that at another position. The temperature continuously spreads around, affecting a display effect. In the prior art, generated heat can be reduced only by reducing power consumption or driving performance. Therefore, in this embodiment, the first heat dissipation adhesive tape 801 is disposed at least at the side of the step portion 102T facing the first portion 30A in the hollow 101K. Heat generated in the vicinity of the hollow 101K, at the position of the first circuit board 70, and at the position of the electrical connection between the flexible circuit board 40 and the first circuit board 70 and in the vicinity thereof is conducted to a position of the first heat dissipation adhesive tape 801 through the low-temperature first portion 30A of the cover plate 30, and guided to the side plate 102 of the housing 10 through the first heat dissipation adhesive tape 801. (According to a heat transfer principle, heat is automatically transferred from a high-temperature object to a low-temperature object. As shown in a heat dissipation path indicated by the dashed lines with arrows in FIG. 12, the position of the first heat dissipation adhesive tape 801 continuously dissipates heat such that the temperature becomes lower. The heat at the position of the first circuit board 70 and at the position of the electrical connection between and the flexible circuit board 40 and the first circuit board 70 and in the vicinity thereof is naturally conducted to the position of the low-temperature first heat dissipation adhesive tape 801.) Because the side plate 102 of the housing 10 has a large contact area with the air, the heat can be rapidly conducted to the air, to achieve rapid and effective heat dissipation and ensure display quality of the display module during use.

In some embodiments, when the first heat dissipation adhesive tape 801 is disposed on the step portion 102T in the hollow 101K, the connection portion 60 may not be disposed in the region. That is, the first heat dissipation adhesive tape 801 and the connection portion 60 do not overlap within the range of the step portion 102T. This means that the connection portion 60 may not be disposed on the step portion 102T in the hollow 101K. Because the first heat dissipation adhesive tape 801 features adhesion and heat dissipation, disposing the first heat dissipation adhesive tape 801 on the step portion 102T in the hollow 101K can also connect and fasten the cover plate 30 to the side plate 102. This can avoid that the connection portion 60 coated with an adhesive layer or the like on the step portion 102T in the hollow 101K affects heat dissipation performance of the region.

In some embodiments, as shown in FIG. 11 and FIG. 12, a width W4 of the first heat dissipation adhesive tape 801 is greater than or equal to 1.5 mm in the direction X from the side plate 102 to the display panel 20.

This embodiment explains that when the first heat dissipation adhesive tape 801 is disposed on the step portion 102T of the side plate 102 in the hollow 101K to achieve heat dissipation during use of the display module, the width W4 of the first heat dissipation adhesive tape 801 in the direction X from the side plate 102 to the display panel 20 needs to be greater than or equal to 1.5 mm. It is assumed that the width W2 of the step portion 102T is greater than or equal to 1.8 mm. It can be ensured that an area of the attached first heat dissipation adhesive tape 801 is large enough to cover as much as possible the width of the step portion 102T of the side plate 102 in the hollow 101K, to achieve optimal heat dissipation performance of the display module.

Figure 13:
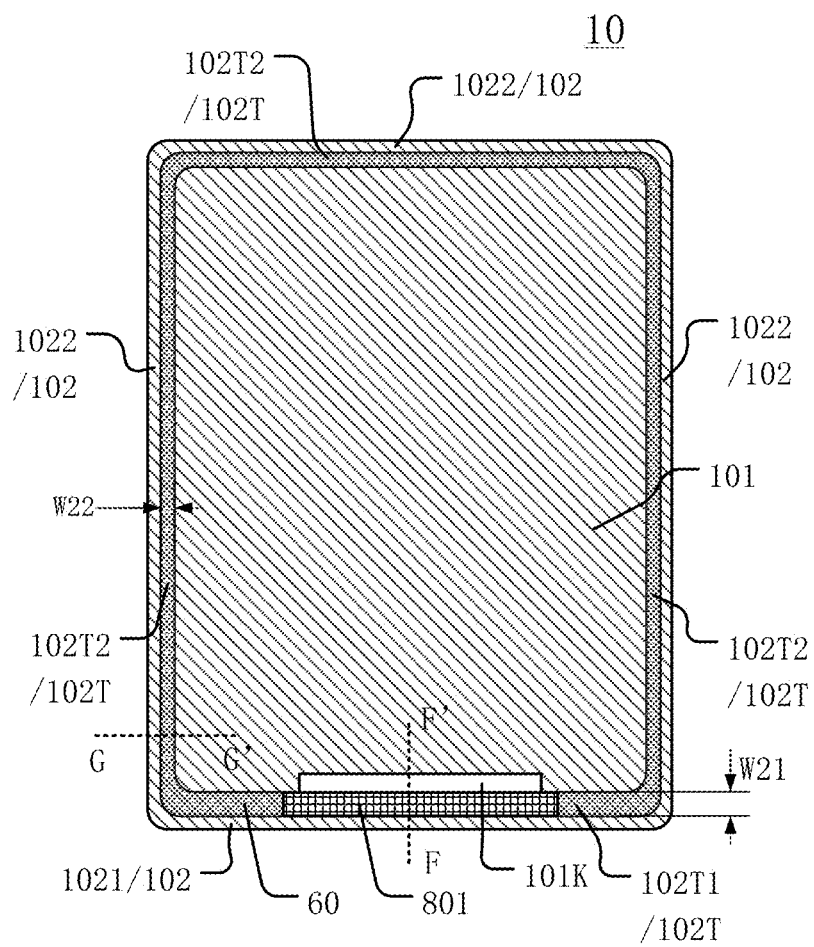
FIG. 13 is a schematic structural diagram of a housing in FIG. 11.
Figure 14:
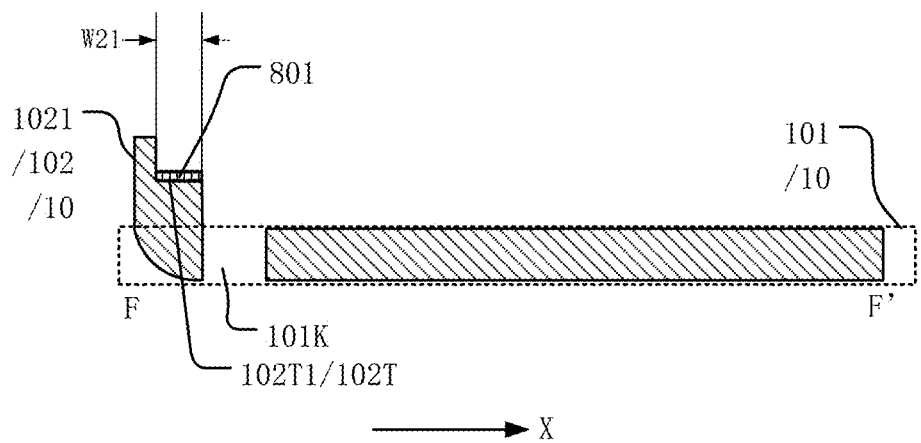
FIG. 14 is a schematic structural diagram of a cross section taken along F-F' in FIG. 13.
Figure 15:
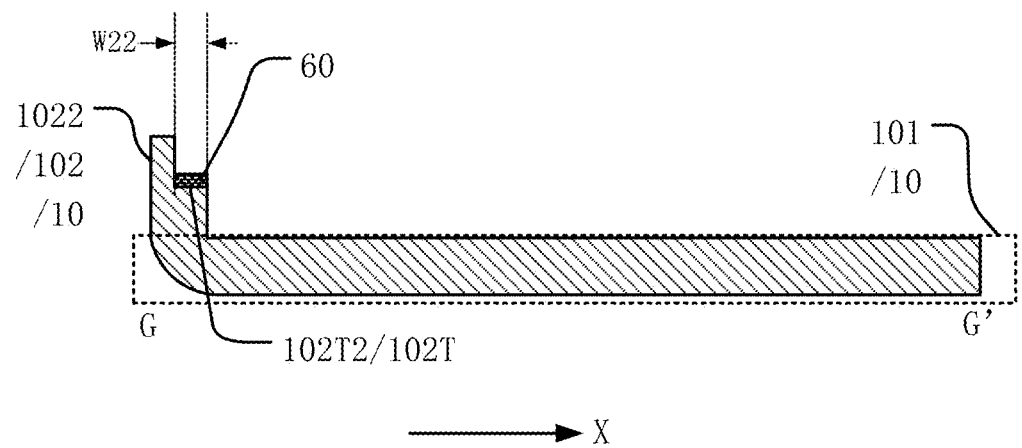
FIG. 15 is a schematic structural diagram of a cross section taken along G-G' in FIG. 13.

In some optional embodiments, as shown in FIG. 11, FIG. 12, FIG. 13, FIG. 14, and FIG. 15. FIG. 13 is a schematic structural diagram of a housing in FIG. 11. FIG. 14 is a schematic structural diagram of a cross section taken along F-F' in FIG. 13. FIG. 15 is a schematic structural diagram of a cross section taken along G-G' in FIG. 13. In this embodiment, the side plate 102 of the housing 10 includes a first side plate 1021 and a second side plate 1022. The first side plate 1021 is located at a side of the backplane 101 adjacent to the hollow 101K.

The step portion 102T included in the first side plate 1021 is a first step portion 102T1. The step portion 102T included in the second side plate 1022 is a second step portion 102T2.

A width W21 of the first step portion 102T1 is greater than a width W22 of the second step portion 102T2 in the direction X from the side plate 102 to the display panel 20.

This embodiment explains that when the side plate 102 is integrated with the backplane 101 at the periphery of the backplane 101 to form the housing 10, the side plates 102 at different edge positions of the backplane 101 may be named the first side plate 1021 and the second side plate 1022. (It can be understood that, that the side plate 102 of the housing 10 includes the first side plate 1021 and the second side plate 1022 does not mean that the first side plate 1021 and the second side plate 1022 are independent structures, but merely names the side plates at different positions differently.) In the first side plate 1021 and the second side plate 1022 included in the side plate 102, the first side plate 1021 is located at the side of the backplane 101 adjacent to the hollow 101K, and the second side plate 1022 may be a side plate structure at another position. In this embodiment, the widths of the step portions 102T of the side plates 102 at different positions are differently designed. For example, if the step portion 102T included in the first side plate 1021 is the first step portion 102T1 and the step portion 102T included in the second side plate 1022 is the second step portion 102T2, the width W21 of the first step portion 102T1 is greater than the width W22 of the second step portion 102T2 in the direction X from the side plate 102 to the display panel 20. That is, the width W21 of the first step portion 102T1 included in the first side plate 1021 in the hollow 101K through which the flexible circuit board 40 passes is larger such that the width W4 of the first heat dissipation adhesive tape 801 attached to the first step portion 102T1 can have a larger attachment area, and a heat dissipation effect at the side adjacent to the hollow 101K can be further improved during use of the display module.

In some embodiments, as shown in FIG. 7 and FIG. 8, in the display module 000 in this embodiment, a distance H1 from the step portion 102T to the backplane 101 is greater than a distance H2 from the light-emitting surface 20E of the display panel 20 to the backplane 101 in a direction Z perpendicular to the plane of the display panel 20. This can ensure that a part of the first portion 30A of the cover plate 30 overlaps the step portion 102T, and avoid that a longitudinal distance from the step portion 102T to the cover plate 30 is too large if the light-emitting surface 20E of the display panel 20 is higher than the step portion 102T, which is not conducive to sealing and fastening the connection portion 60 of the adhesive layer, to help ensure reliable sealing performance after module assembly.

In some embodiments, as shown in FIG. 7 and FIG. 8, in the display module 000 in this embodiment, a width W5 of the hollow 101K is greater than or equal to 2 mm in the direction X from the side plate 102 to the display panel 20.

This embodiment explains that the backplane 101 of the housing 10 includes at least one hollow 101K. When the hollow 101K is provided at the side of the side plate 102 adjacent to the display panel 20, the width W5 of the hollow 101K provided in the backplane 101 needs to be greater than or equal to 2 mm such that the flexible circuit board 40 electrically connected to the display panel 20 can pass through the hollow 101K with the width and then bend to the side of the backplane 101 away from the display panel 20. This prevents interference problems during module assembly, such as extrusion and collision between the flexible circuit board 40 and the edge of the backplane 101 in the hollow 101K, and can ensure a service life of the flexible circuit board 40.

Figure 16:
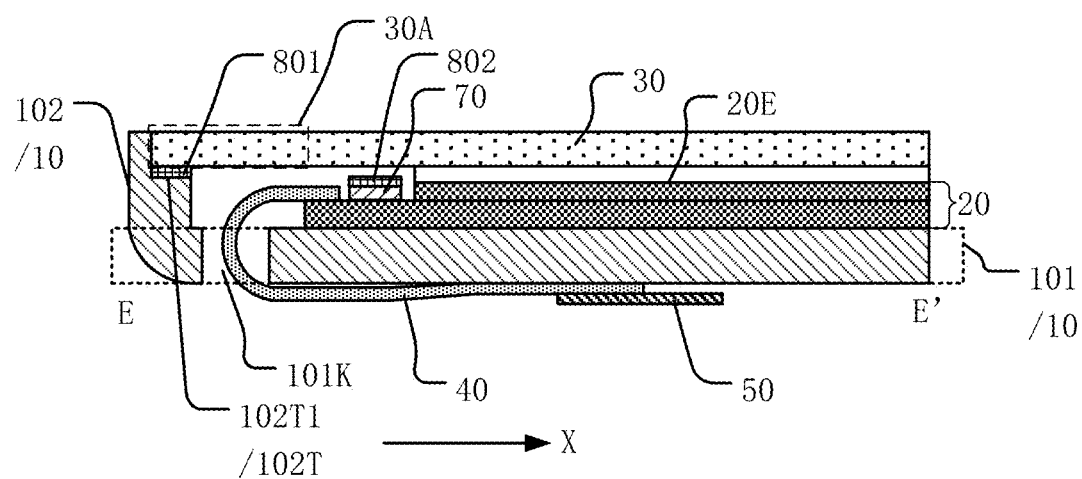
FIG. 16 is another schematic structural diagram of a cross section taken along E-E' in FIG. 11.
Figure 17:
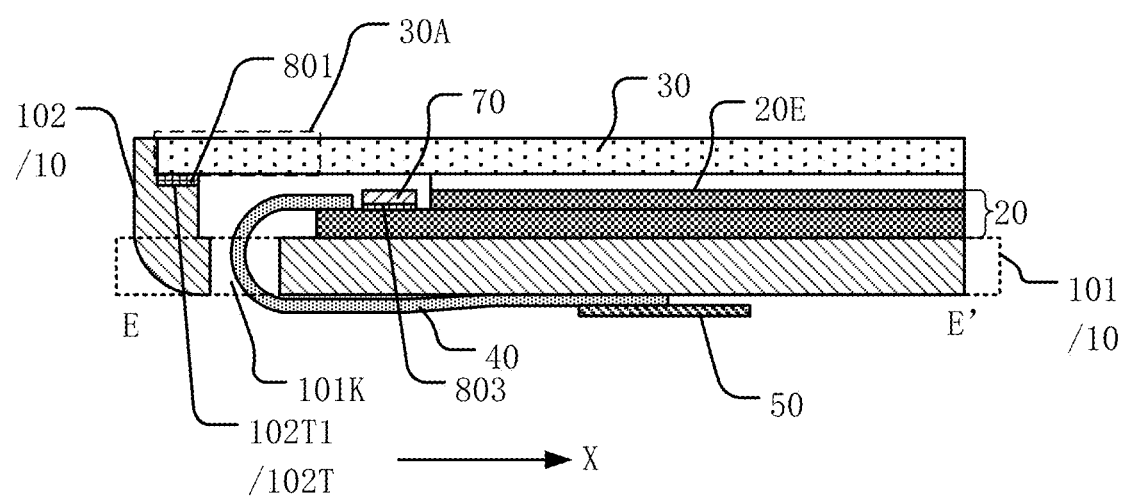
FIG. 17 is another schematic structural diagram of a cross section taken along E-E' in FIG. 11.
Figure 18:
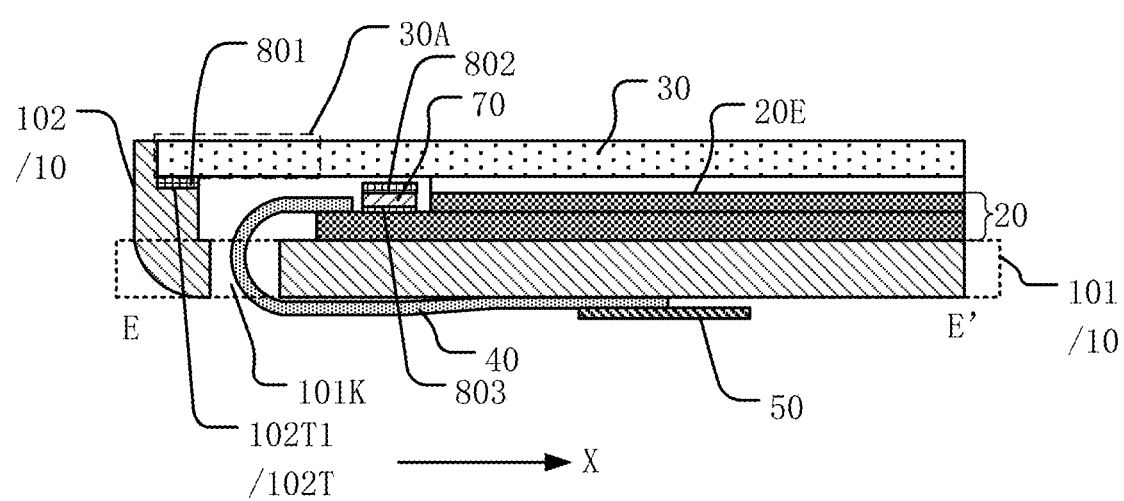
FIG. 18 is another schematic structural diagram of a cross section taken along E-E' in FIG. 11.

In some optional embodiments, as shown in FIG. 11, FIG. 16, FIG. 17, and FIG. 18. FIG. 16 is another schematic structural diagram of a cross section taken along E-E' in FIG. 11. FIG. 17 is another schematic structural diagram of a cross section taken along E-E' in FIG. 11. FIG. 18 is another schematic structural diagram of a cross section taken along E-E' in FIG. 11. In this embodiment, the flexible circuit board 40 is electrically connected to the display panel 20 through the first circuit board 70. The first circuit board 70 is located in the non-display region NA of the display panel 20.

A second heat dissipation adhesive tape 802 is disposed on a side surface of the first circuit board 70 facing the cover plate 30; and/or a third heat dissipation adhesive tape 803 is disposed on a side surface of the first circuit board 70 facing the backplane 101.

This embodiment explains that the flexible circuit board 40 may be electrically connected to the display panel 20 through the first circuit board 70 bound to the non-display region NA of the display panel 20. The first circuit board 70 may be a driver IC. For example, the display panel 20 is a liquid crystal display panel. In addition to the backlight module, the display panel 20 further includes a liquid crystal panel composed of an array substrate and a color filter substrate. The flexible circuit board 40 may be a circuit board configured to drive the liquid crystal panel. The first circuit board 70 may be bound to a step binding position of the array substrate beyond the color filter substrate. The flexible circuit board 40 is electrically connected to the display panel 20 through the first circuit board 70. That is, a packaging technology of the display panel 20 is a COG packaging technology, to transmit a drive signal among the flexible circuit board 40, the first circuit board 70, and the display panel 20 to light up the screen. The display module using the COG packaging technology can be thin and have high reliability and proper cost advantages. When the display module 000 includes the first circuit board 70, a main heat source during use of the display module is the first circuit board 70 bound to the non-display region NA of the display panel 20. Therefore, in this embodiment, a heat dissipation adhesive tape is further attached to the array substrate above the first circuit board 70, that is, on an upper surface of the first circuit board 70, or below the first circuit board 70, that is, at a position where the first circuit board 70 is bound. The second heat dissipation adhesive tape 802 is disposed on the side surface of the first circuit board 70 facing the cover plate 30 (as shown in FIG. 16). Alternatively, the third heat dissipation adhesive tape 803 is disposed on the side surface of the first circuit board 70 facing the display panel 20 (as shown in FIG. 17). Alternatively, the second heat dissipation adhesive tape 802 is disposed on the side surface of the first circuit board 70 facing the cover plate 30, and the third heat dissipation adhesive tape 803 is disposed on the side surface of the first circuit board 70 facing the backplane 101 (as shown in FIG. 18), to further improve a heat dissipation effect during use of the display module and ensure the display quality of the display module.

Figure 19:
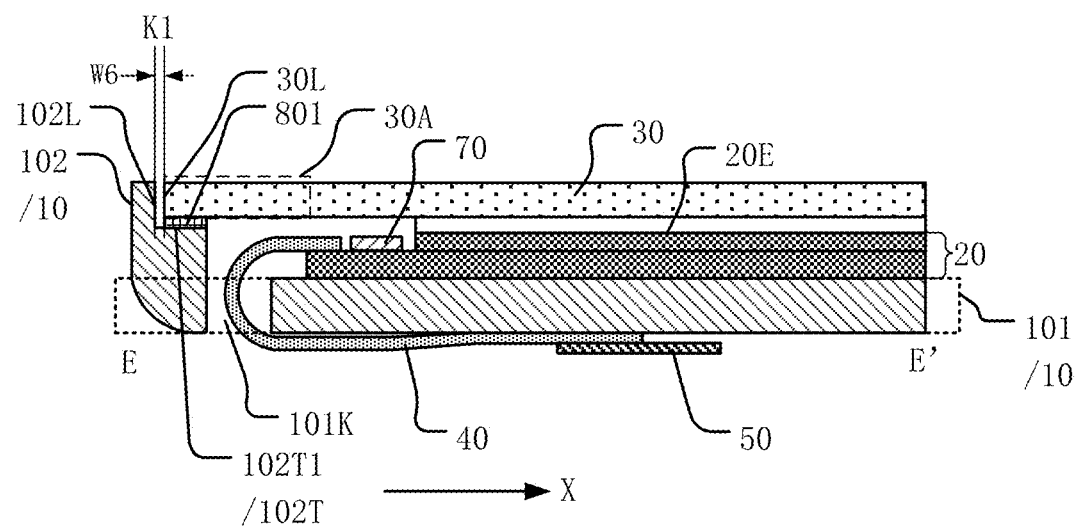
FIG. 19 is another schematic structural diagram of a cross section taken along E-E' in FIG. 11.
Figure 20:
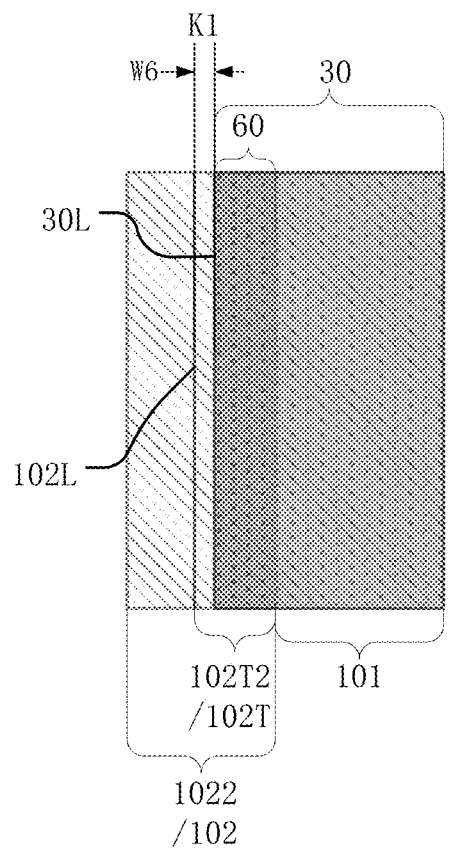
FIG. 20 is a locally enlarged schematic diagram of a region J1 in FIG. 11.

In some optional embodiments, as shown in FIG. 11, FIG. 19, and FIG. 20. FIG. 19 is another schematic structural diagram of a cross section taken along E-E' in FIG. 11. FIG. 20 is a locally enlarged schematic diagram of a region J1 in FIG. 11. (It can be understood that FIG. 20 is filled with transparency to clearly illustrate a structure in this embodiment). In this embodiment, there is a first gap K1 between the edge 30L of the cover plate 30 and the side plate 102. A width W6 of the first gap K1 is greater than or equal to 0.3 mm.

This embodiment explains that a size of the housing 10 may be designed with reference to a size of the cover plate 30 included in the display module. After assembly, the first gap K1 needs to be left between the edge 30L of the cover plate 30 and a side 102L of the side plate 102 facing the cover plate 30. The width W6 of the first gap K1 is greater than or equal to 0.3 mm. When the housing 10 protects an entire module structure, a material of the housing 10 shrinks at a low temperature. Therefore, to prevent the housing 10 from squeezing the edge 30L of the cover plate 30 after shrinking and causing damage to the cover plate 30, when the housing 10 is designed, the first gap K1 needs to be left between the edge 30L of the cover plate 30 and the side plate 102 if spatially allowed. The width W6 of the first gap K1 is greater than or equal to 0.3 mm. Even if the housing 10 shrinks and deforms in a low-temperature environment, the side plate 102 of the housing 10 does not squeeze the edge 30L of the cover plate 30. This helps improve reliability and a service life of the module structure.

Figure 21:
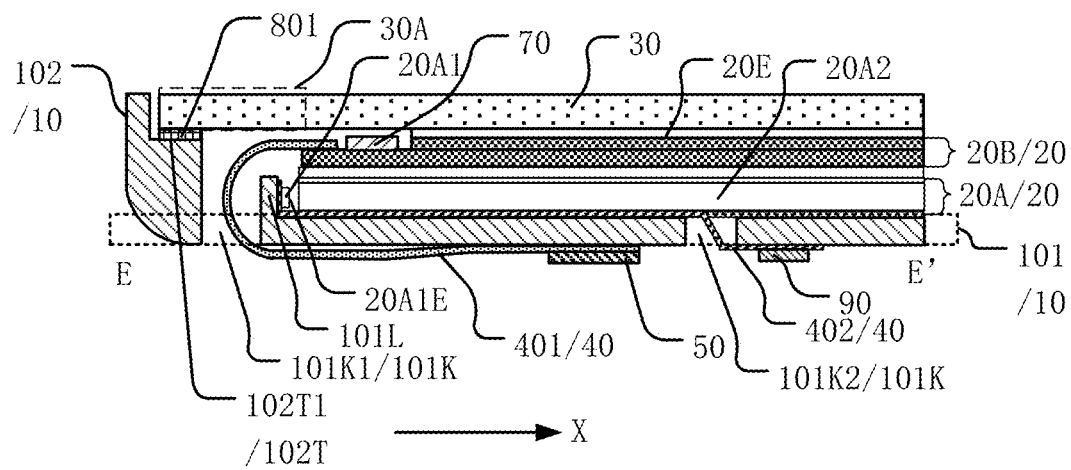
FIG. 21 is another schematic structural diagram of a cross section taken along E-E' in FIG. 11.
Figure 22:
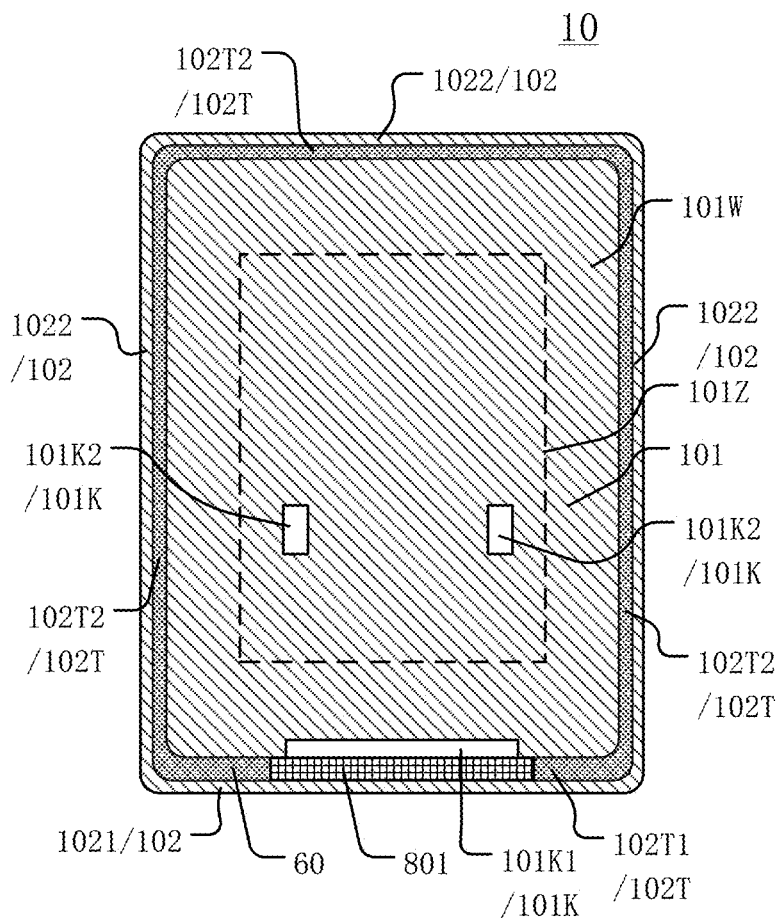
FIG. 22 is another schematic structural diagram of a housing in FIG. 11.

In some optional embodiments, as shown in FIG. 11, FIG. 21, and FIG. 22. FIG. 21 is another schematic structural diagram of a cross section taken along E-E' in FIG. 11. FIG. 22 is another schematic structural diagram of a housing in FIG. 11. In this embodiment, the display panel 20 includes a backlight module 20A and a light control panel 20B. The backlight module 20A is located at a side of the light control panel 20B away from the cover plate 30.

The backlight module 20A includes a backlight source 20A1 and a plurality of optical films 20A2 (not filled in FIG. 21). The backlight source 20A1 is electrically connected to a light source drive unit 90. The light source drive unit 90 is disposed at a side of the backplane 101 away from the backlight module 20A.

The flexible circuit board 40 includes a first flexible circuit board 401 electrically connected to the light control panel 20B and a second flexible circuit board 402 electrically connected to the backlight source 20A1.

The hollow 101K includes a first hollow 101K1 corresponding to the first flexible circuit board 401 and a second hollow 101K2 corresponding to the second flexible circuit board 402. The first flexible circuit board 401 passes through the first hollow 101K1. The second flexible circuit board 402 passes through the second hollow 101K2.

This embodiment explains that the display panel 20 included in the display module 000 may be a liquid crystal display panel. The display panel 20 includes the backlight module 20A and the light control panel 20B. The backlight module 20A is located at the side of the light control panel 20B away from the cover plate 30. The light control panel 20B may be a liquid crystal panel including an array substrate and a color filter substrate. The light control panel 20B does not emit light. Its working principle is applying a drive voltage to the color filter substrate and/or the array substrate to control rotation of liquid crystal molecules in a liquid crystal layer of the color filter substrate and the array substrate, change a polarization status of light of the backlight module 20A, control an amount of transmitted light through an upper polarizer and a lower polarizer disposed outside the light control panel 20B to implement penetration and blocking of an optical path, and finally refract the light of the backlight module 20A to generate a displayed image.

In some embodiments, the backlight module 20A may be classified as an edge-lit backlight module or a direct-lit backlight module based on different incident positions of light sources. In this embodiment, for example, the backlight source 20A1 included in the backlight module 20A is an edge-lit backlight source. The plurality of optical films 20A2 may include a light guide plate, diffusing film, luminance enhancement film, and the like that are stacked. Details are not described herein in this embodiment. This can be specifically understood by referring to a structure of a liquid crystal display panels in the related art.

When the display panel 20 in this embodiment is a liquid crystal display panel, the light control panel 20B needs to transmit a drive signal to control deflection of the liquid crystal layer between the array substrate and the color filter substrate. The backlight module 20A also needs to transmit a drive signal to control the backlight source 20A1 to emit light. Therefore, the flexible circuit board 40 electrically connected to the display panel 20 in this embodiment includes not only the first flexible circuit board 401 electrically connected to the light control panel 20B, but also the second flexible circuit board 402 electrically connected to the backlight source 20A1. In this case, the hollow 101K of the backplane 101 may include not only the first hollow 101K1 corresponding to the first flexible circuit board 401, but also the second hollow 101K2 corresponding to the second flexible circuit board 402. The first flexible circuit board 401 passes through the first hollow 101K1 and is electrically connected to the driving circuit board 50 at the side of the backplane 101 away from the backlight module 20A. The second flexible circuit board 402 passes through the second hollow 101K2 and is electrically connected to the light source drive unit 90 at the side of the backplane 101 away from the backlight module 20A. It can be understood that the light source drive unit 90 in this embodiment may be a separate driver IC (as shown in FIG. 21). Alternatively, the light source drive unit 90 may be integrated into the driving circuit board 50, sharing the driving circuit board with the light control panel 20B (not shown).

It can be understood that the figure in this embodiment merely shows an example for a position of the second hollow 101K2 in the backplane 101. In specific implementation, the position of the second hollow 101K2 includes but is not limited to this, and may alternatively be another position in the backplane 101. This is not limited in this embodiment, provided that the first hollow 101K1 is located at the side of the side plate 102 adjacent to the display panel 20.

In some embodiments, as shown in FIG. 21, the housing 10 in this embodiment forms a space for accommodating other structures, such as the backlight module 20A, the light control panel 20B, and the cover plate 30. The backplane 101 may include a baffle plate 101L for disposing the backlight source 20A1 at a position where the backlight source 20A1 is disposed on the backplane 101. The baffle plate 101L may be disposed at a position of the first hollow 101K1. The baffle plate 101L does not destroy a size of the first hollow 101K1. An extension direction of the baffle plate 101L may be the same as that of the side plate 102. That is, the baffle plate 101L is basically parallel to the side plate 102. In this way, a light-emitting surface 20A1E of the backlight source 20A1 disposed on the baffle plate 101L faces at least the light guide plate in the plurality of optical films 20A2, to ensure that the light exiting from the edge-lit backlight source 20A1 passes through the optical films 20A2 to provide backlight for the light control panel 20B.

In some embodiments, as shown in FIG. 11, FIG. 21, and FIG. 22, in this embodiment, the backplane 101 includes a middle region 101Z and a peripheral region 101W disposed around the middle region 101Z. The peripheral region 101W is located at a side of the middle region 101Z adjacent to the side plate 102.

The second hollow 101K2 is located in the middle region 101Z. In addition, the second hollow 101K2 is located at a side of the first hollow 101K1 away from the side plate 102.

This embodiment explains that the second flexible circuit board 402 electrically connected to the backlight source 20A1 passes through the second hollow 101K2 and is electrically connected to the light source drive unit 90 at the side of the backplane 101 away from the backlight module 20A. The second hollow 101K2 can avoid the peripheral region 101W of the backplane 101. The peripheral region 101W may be understood as a region adjacent to the edge of the backplane 101. Further, preferably, the second hollow 101K2 is provided in the middle region 101Z of the backplane 101. When the display module 000 is applied to some display terminals, the side of the backplane 101 away from the display panel 20 can be fastened to some carrying structures of the display terminals. In this case, providing the second hollow 101K2 in the middle region 101Z of the backplane 101 helps shield the second hollow 101K2 in the middle region 101Z through some structures of the display terminals for carrying the display module 000, to prevent exposure of the second hollow 101K2 from affecting aesthetics of the entire module structure, and further helps improve an aesthetic effect of the overall structure. In addition, the second hollow 101K2 is provided to avoid the peripheral region 101W of the backplane 101. This can facilitate a sealing effect in the peripheral region 101W of the backplane 101 when the housing 10 is installed with other platform structures, and improve waterproof and dust-proof performance of the overall structure.

It can be understood that quantities of first hollows 101K1 and second hollows 101K2 are not limited in this embodiment. An example in which the backplane 101 includes one first hollow 101K1 and two second hollows 101K2 is used in FIG. 22. In specific implementation, the quantities of second hollows 101K2 and first hollows 101K1 may be set based on an actual electrical connection requirement.

Figure 23:
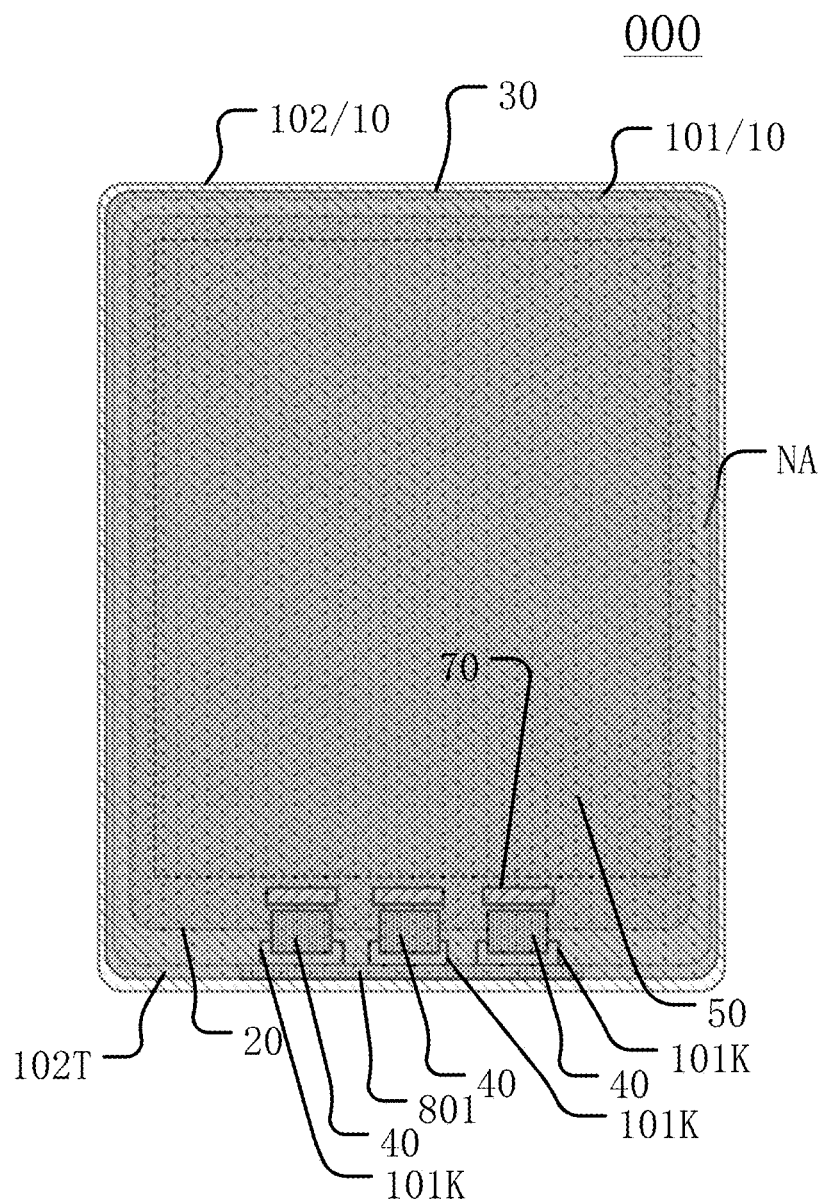
FIG. 23 is another schematic planar structural diagram of a display module according to an embodiment of the present disclosure.

In some optional embodiments, as shown in FIG. 11 and FIG. 23. FIG. 23 is another schematic planar structural diagram of a display module according to an embodiment of the present disclosure. (It can be understood that FIG. 23 is filled with transparency to clearly illustrate a structure in this embodiment.) The backplane 101 in this embodiment may include N hollows 101K. The display panel 20 is electrically connected to N flexible circuit boards 40. The flexible circuit boards 40 are in a one-to-one correspondence with the hollows 101K. N is a positive integer.

This embodiment explains that a quantity of flexible circuit boards 40 electrically connected to the display panel 20 may be the same as that of hollows 101K in the backplane 101. As shown in FIG. 11, the display panel 20 is electrically connected to one flexible circuit board 40. The backplane 101 may include one hollow 101K. The flexible circuit board 40 may pass through the hollow 101K. Alternatively, as shown in FIG. 23, the display panel 20 is electrically connected to N (for example, three) flexible circuit boards 40. The backplane 101 may include N (for example, three) hollows 101K. Each flexible circuit board 40 may pass through the corresponding hollow 101K and be electrically connected to the driving circuit board 50 at the side of the backplane 101 away from the display panel 20. Positions and the quantity of hollows 101K in the backplane 101 of the housing 10 in this embodiment may be set based on different disposition manners of the flexible circuit board 40. This helps reduce a hollowed-out area of the backplane 101 as much as possible and improve stability of the housing 10.

Figure 24:
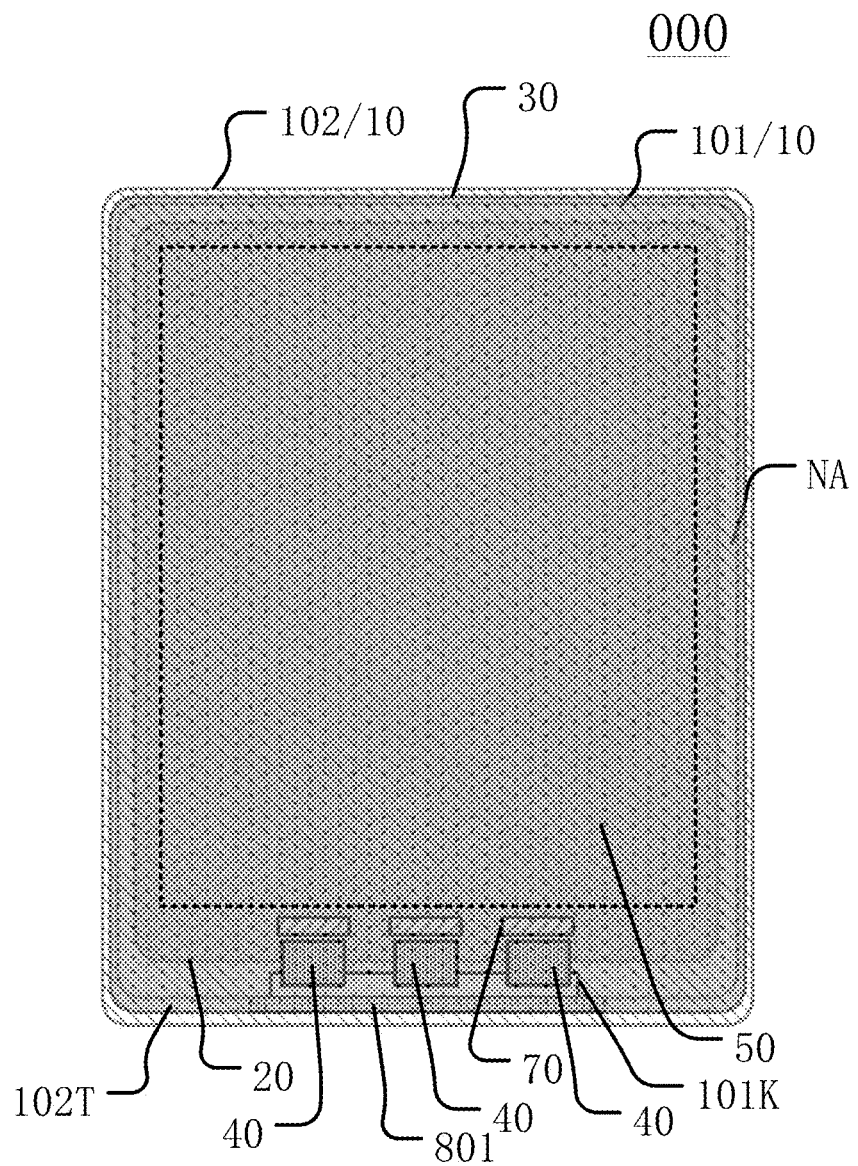
FIG. 24 is another schematic planar structural diagram of a display module according to an embodiment of the present disclosure.

In some optional embodiments, as shown in FIG. 24. FIG. 24 is another schematic planar structural diagram of a display module according to an embodiment of the present disclosure. (It can be understood that FIG. 24 is filled with transparency to clearly illustrate a structure in this embodiment.) The backplane 101 in this embodiment may include one hollow 101K. The display panel 20 is electrically connected to M flexible circuit boards 40. The M flexible circuit boards 40 correspond to the one hollow 101K. M is an integer greater than 2.

This embodiment explains that a quantity of flexible circuit boards 40 electrically connected to the display panel 20 may be different from that of hollows 101K in the backplane 101. As shown in FIG. 24, regardless of the quantity of flexible circuit boards 40 electrically connected to the display panel 20, if the display panel 20 is electrically connected to M (for example, three) flexible circuit boards 40, the backplane 101 may still be provided with only one long-strip-shaped hollow 101K. The M (for example, three) flexible circuit boards 40 pass through the hollow 101K and are electrically connected to the driving circuit board 50 at the side of the backplane 101 away from the display panel 20. In this embodiment, the quantity of hollows 101K in the backplane 101 of the housing 10 may be fixed. Even if the quantity of flexible circuit boards 40 increases, the quantity of hollows 101K may be unchanged. This helps reduce difficulty in manufacturing the housing 10 and manufacturing costs.

Figure 25:
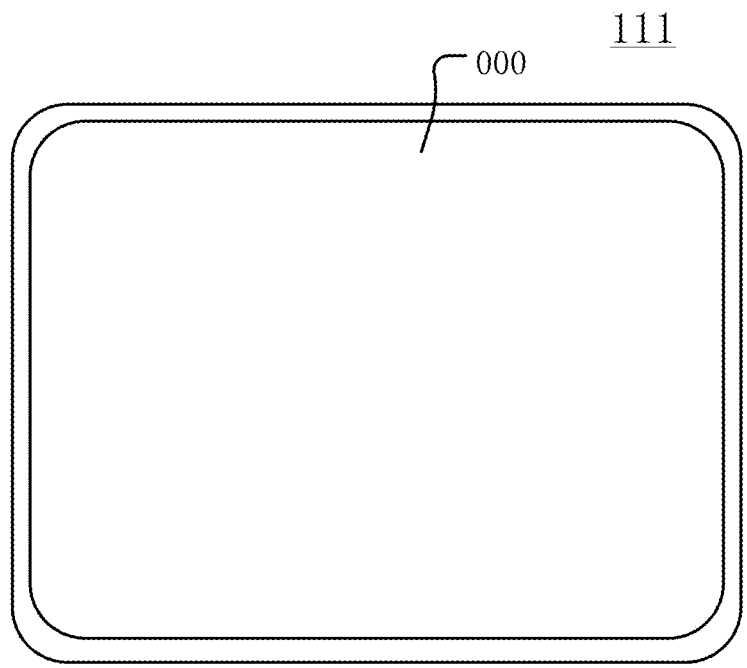
FIG. 25 is a schematic planar structural diagram of a terminal according to an embodiment of the present disclosure.

In some optional embodiments, as shown in FIG. 25. FIG. 25 is a schematic planar structural diagram of a terminal according to an embodiment of the present disclosure. A terminal 111 provided in this embodiment includes the display module 000 provided in the foregoing embodiments of the present disclosure. The embodiment in FIG. 25 uses a mobile phone as an example to describe the terminal 111. It can be understood that the terminal 111 provided in the embodiments of the present disclosure may alternatively be a computer, a television, an in-vehicle display apparatus, or another terminal 111 device having a display function. This is not specifically limited in the present disclosure. The terminal 111 provided in the embodiments of the present disclosure has the beneficial effects of the display module 000 provided in the embodiments of the present disclosure. For details, reference may be made to the specific description of the display module 000 in the foregoing embodiments. Details are not described again herein in this embodiment.

Figure 26:
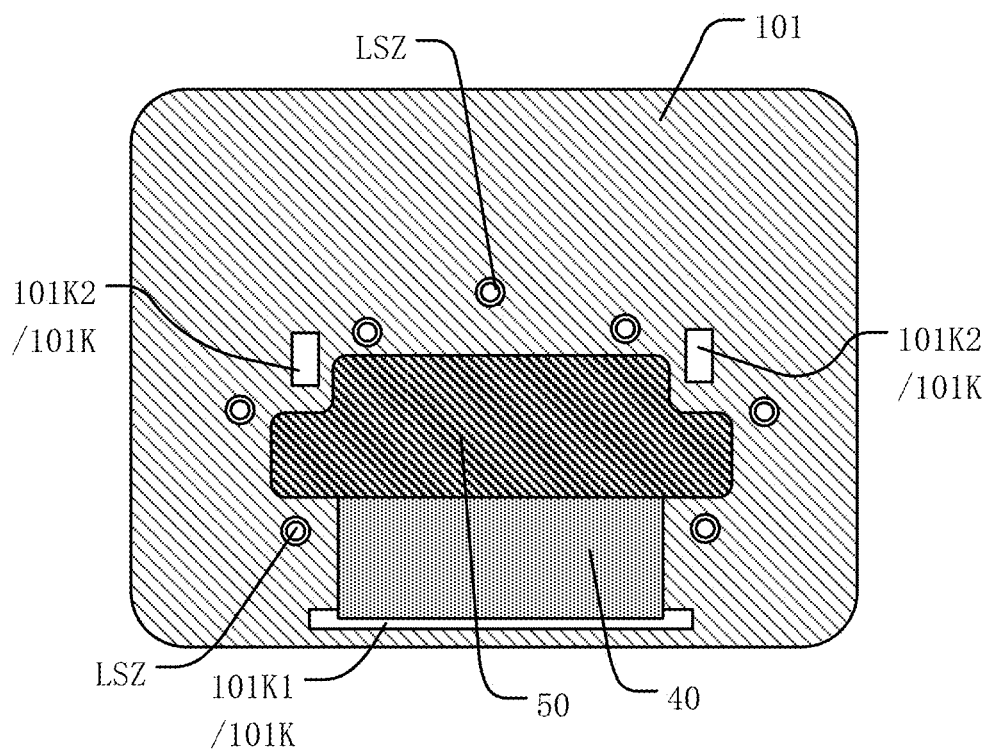
FIG. 26 is a schematic structural diagram of a backlight surface of the terminal in FIG. 25.

In some optional embodiments, as shown in FIG. 25 and FIG. 26. FIG. 26 is a schematic structural diagram of a backlight surface of the terminal in FIG. 25. The terminal 111 provided in this embodiment includes the display module 000. The backplane 101 of the display module 000 includes a plurality of screw posts LSZ. The screw posts LSZ do not overlap the driving circuit board 50.

This embodiment explains that the terminal 111 may include the display module 000 in any one of the foregoing embodiments. For example, the structure of the display module 000 is the structure in the embodiment shown in FIG. 21. In some embodiments, the terminal 111 may be an in-vehicle display device mounted in a vehicle for viewing by a driver and passenger. When the terminal 111 in this embodiment includes the display module 000, the plurality of screw posts LSZ are provided in the backplane 101 of the display module 000. In some embodiments, the plurality of screw posts LSZ may be provided at the side of the backplane 101 away from the display panel 20. The plurality of screw posts LSZ provided in the backplane 101 are mainly used to lock screws when the terminal 111 is fastened to a device or another structural member in the vehicle, to fasten the terminal 111 to the device or another structural member in the vehicle. Therefore, the screw post LSZ may penetrate through an entire thickness of the backplane 101. Alternatively, the screw post LSZ may not penetrate through the thickness of the backplane 101. This is not limited in this embodiment, provided that the terminal 111 can be stably fastened to another structural member by locking screws in the screw posts LSZ.

It can be understood that a size and quantity of the plurality of screw posts LSZ are not limited in this embodiment. In specific implementation, they may be set based on a size and weight of the terminal 111, to ensure reliability of a connection between the terminal 111 and another structural member.

In some embodiments, as shown in FIG. 26, the driving circuit board 50 included in the display module 000 is located at the side of the backplane 101 away from the display panel 20. The screw posts LSZ do not overlap the driving circuit board 50 at the side of the backplane 101 away from the display panel 20. That is, positions of the screw posts LSZ need to avoid the driving circuit board 50 to prevent interference between the driving circuit board 50 and the screw posts LSZ such that the driving circuit board 50 can be normally mounted at the side of the backplane 101 away from the display panel 20.

It can be understood that a shape of the driving circuit board 50 is not limited in this embodiment. The figure merely shows an example for the shape of the driving circuit board 50. In specific implementation, the shape of the driving circuit board 50 may be adjusted based on its own integrated lines, components, and other structures.

Figure 27:
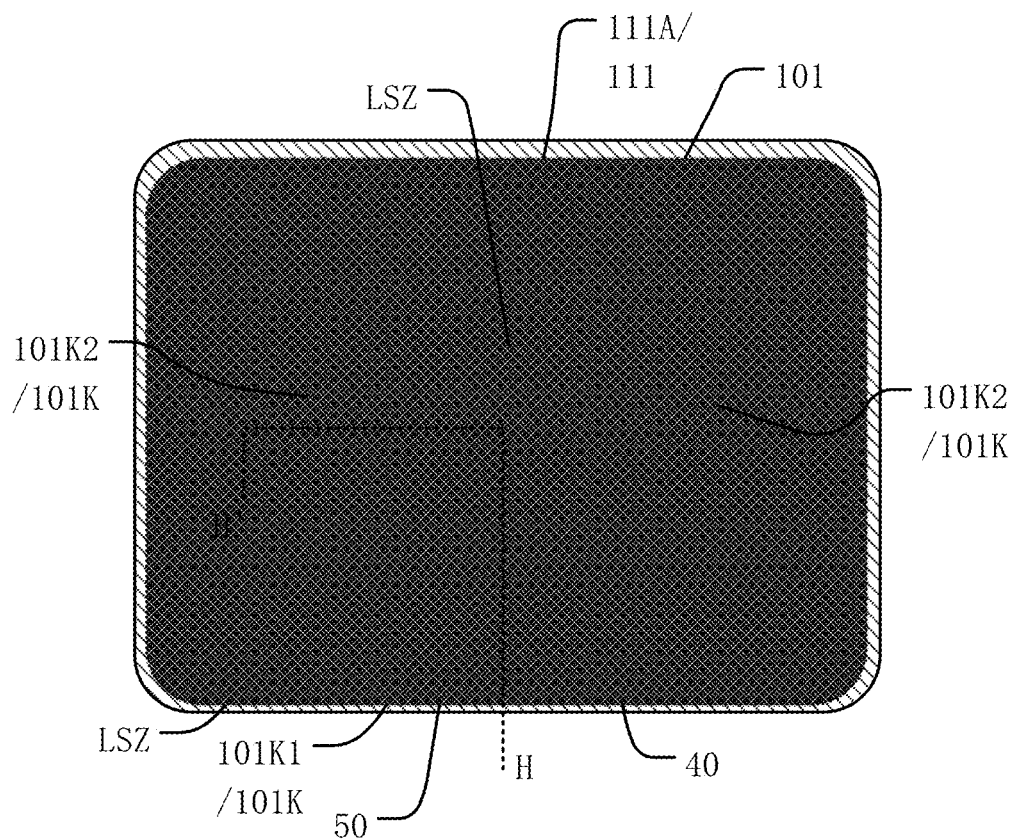
FIG. 27 is another structural diagram of a backlight surface of the terminal in FIG. 25.
Figure 28:
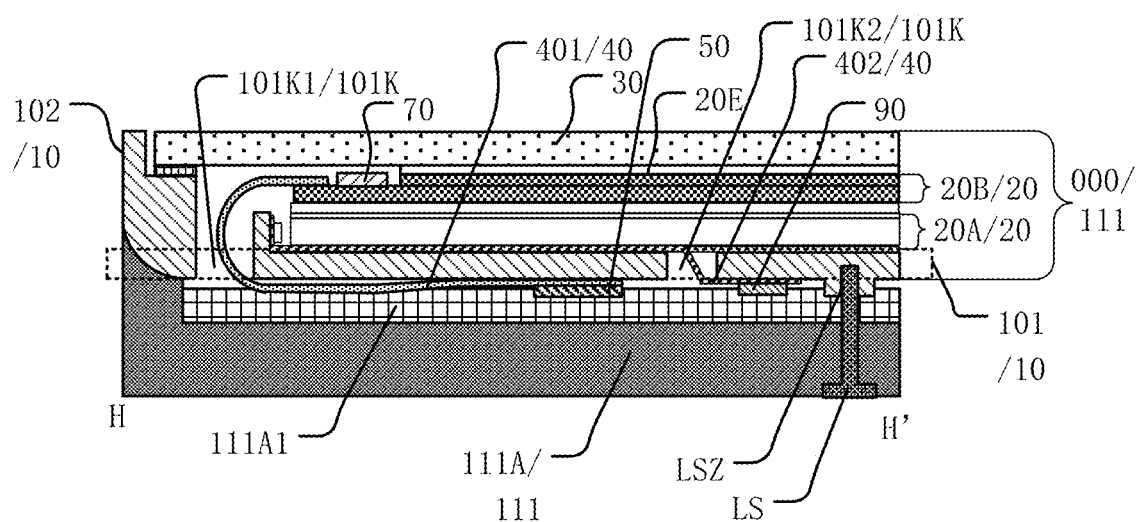
FIG. 28 is a schematic structural diagram of a cross section taken along H-H' in FIG. 27.

In some embodiments, as shown in FIG. 25, FIG. 27, and FIG. 28. FIG. 27 is another structural diagram of a backlight surface of the terminal in FIG. 25. FIG. 28 is a schematic structural diagram of a cross section taken along H-H' in FIG. 27. (It can be understood that FIG. 27 is filled with transparency to clearly illustrate a structure in this embodiment.) The terminal 111 in this embodiment further includes a platform 111A. The side of the backplane 101 away from the display panel 20 is fastened to the platform 111A through a screw post LSZ.

This embodiment explains that a structure of the terminal 111 further includes the platform 111A. The platform 111A is mainly configured to carry the structure of the entire terminal 111. The platform 111A may also play a role of fixedly connecting the terminal 111 to another device. The platform 111A is disposed at the side of the backplane 101 away from the display panel 20. The backplane 101 of the terminal 111 may be connected and fastened to the platform 111A through the screw post LSZ. In some embodiments, the platform 111A in this embodiment may be disposed at the side of the backplane 101 away from the display panel 20. The platform 111A may cover at least the first hollow 101K1, the second hollow 101K2, the driving circuit board 50, and the like on the backplane 101. Further, the platform 111A shields the hollow and the like at the side of the backplane 101 away from the display panel 20. This helps ensure aesthetics of the entire structure of the terminal 111 after the platform 111A and the display module 000 are assembled, and also ensure overall waterproof and dustproof performance of the terminal 111.

It can be understood that a shape of the platform 111A in this embodiment may be a frame with which all structures (such as the flexible circuit board 40, the driving circuit board 50, and the screw posts LSZ) at the side of the backplane 101 away from the display panel 20 are wrapped. Alternatively, the platform 111A may have another shape. This is not limited in this embodiment. When the terminal 111 in this embodiment is an in-vehicle display terminal, the platform 111A may be a carrying mesa structure in a vehicle. In some other embodiments, the platform 111A may alternatively have another shape. This may be specifically designed based on an application scenario of the terminal 111. Details are not described herein in this embodiment. As shown in FIG. 28, when the terminal 111 is fastened to the platform 111A in the vehicle, the terminal 111 may be fastened to the platform 111A by locking a screw LS in the screw post LSZ.

In some embodiments, as shown in FIG. 28, the platform 111A in this embodiment includes a sealing structure 111A1. The sealing structure 111A1 covers at least the driving circuit board 50 and the screw post LSZ at the side of the backplane 101 away from the display panel 20. The sealing structure 111A1 may be a material such as a filler having a sealing effect. The sealing structure 111A1 included in the platform 111A can cover the driving circuit board 50 and all screw posts LSZ at the side of the backplane 101 away from the display panel 20. Further, in some embodiments, the sealing structure 111A1 included in the platform 111A can also cover the hollow 101K in the backplane 101. This can effectively improve waterproof and dustproof performance of the structure of the terminal 111 and ensure a use effect of the terminal 111.

It can be understood that before the platform 111A and the display module 000 are assembled in this embodiment, the structure of the display module 000 itself may have been assembled. That is, the housing 10, the display panel 20, the cover plate 30, the flexible circuit board 40, the driving circuit board 50, and the like have been assembled. When the platform 111A and the display module 000 are assembled, the structure of the terminal 111 can be completed only by locking the screw LS in the screw post LSZ of the backplane 101 to fasten the platform 111A. The sealing structure 111A1 in FIG. 28 may be understood as a filled sealing material. The platform 111A may be filled with the material before the platform 111A and the display module 000 are assembled. Alternatively, another filling method may be used. This is not limited in this embodiment, provided that the filled sealing structure 111A1 can cover and shield at least the driving circuit board 50 and all screw posts LSZ at the side of the backplane 101 away from the display panel 20 after the display module 000 and the platform 111A are assembled. Disposing the sealing structure 111A1 can ensure a sealing effect of the entire terminal 111. The filled sealing structure 111A1 can also ensure structural stability of the entire terminal 111.

Figure 29:
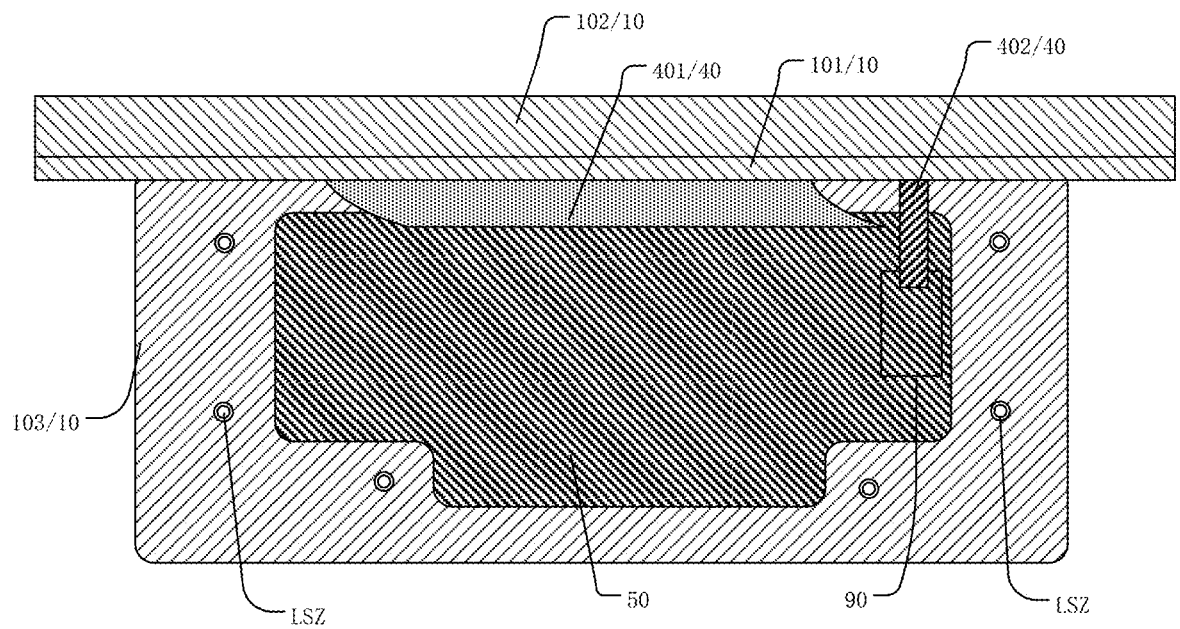
FIG. 29 is a schematic structural side view of the terminal in FIG. 25.

In some optional embodiments, as shown in FIG. 25 and FIG. 29. FIG. 29 is a schematic structural side view of the terminal in FIG. 25. The terminal 111 provided in this embodiment includes the display module 000. The housing 10 of the display module 000 further includes a boss 103 protruding from the backplane 101. The driving circuit board 50 is located in the boss 103.

This embodiment explains that when the driving circuit board 50 electrically connected to the flexible circuit board 40 and configured to provide a drive signal for the display panel 20 is disposed at the side of the backplane 101 away from the display panel 20, the driving circuit board 50 may be parallel to the plane of the backplane 101 (as shown in FIG. 26 to FIG. 28), and bonded and fastened to the backplane 101. Alternatively, as shown in FIG. 29, the driving circuit board 50 may not be parallel to the plane of the backplane 101. The driving circuit board 50 may be basically perpendicular to the plane of the backplane 101. Specifically, the housing 10 of the display module 000 further includes the boss 103 protruding from the backplane 101. An overall extension direction of the boss 103 may be perpendicular to or intersect with that of the backplane 101. The driving circuit board 50 may be disposed in the boss 103. This is equivalent to fastening the driving circuit board 50 at the side of the backplane 101 away from the display panel 20, to apply to different scenarios of a connection between the terminal 111 and another device.

In some embodiments, as shown in FIG. 29, the boss 103 in the terminal 111 may include a plurality of screw posts LSZ. The terminal 111 may include the display module 000 in any one of the foregoing embodiments. The terminal 111 may be an in-vehicle display device mounted in a vehicle for viewing by a driver and passenger. When the terminal 111 in this embodiment includes the display module 000, the plurality of screw posts LSZ are provided in the boss 103 of the housing 10. Further, in some embodiments, the plurality of screw posts LSZ may be provided at the same side of the boss 103 as the driving circuit board 50. The plurality of screw posts LSZ provided in the boss 103 are mainly used to lock screws when the terminal 111 is fastened to a device or another structural member in the vehicle, to fasten the terminal 111 to the device or another structural member in the vehicle. Therefore, the screw post LSZ may penetrate through an entire thickness of the boss 103. Alternatively, the screw post LSZ may not penetrate through the thickness of the boss 103. This is not limited in this embodiment, provided that the boss 103 of the terminal 111 can be stably fastened to another structural member by locking screws in the screw posts LSZ.

In some embodiments, when the display panel 20 is a liquid crystal display panel including a backlight module and a light control panel, the first flexible circuit board 401 for driving the light control panel 20B is electrically connected to the driving circuit board 50, and the second flexible circuit board 402 for driving the backlight module is electrically connected to the light source drive unit 90. The light source drive unit 90 may also be disposed in the boss 103. The light source drive unit 90 may be integrated to the driving circuit board 50. This helps reduce a layout space in the boss 103.

It can be understood that a size and quantity of the plurality of screw posts LSZ are not limited in this embodiment. In specific implementation, they may be set based on a size and weight of the terminal 111, to ensure reliability of a connection between the terminal 111 and another structural member.

In some embodiments, when the driving circuit board 50 included in the display module 000 is located in the boss 103, the screw posts LSZ do not overlap the driving circuit board 50. That is, positions of the screw posts LSZ need to avoid the driving circuit board 50 to prevent interference between the driving circuit board 50 and the screw posts LSZ such that the driving circuit board 50 can be normally mounted in the boss 103.

It can be understood that a shape of the driving circuit board 50 is not limited in this embodiment. The figure merely shows an example for the shape of the driving circuit board 50. In specific implementation, the shape of the driving circuit board 50 may be adjusted based on its own integrated lines, components, and other structures.

Figure 30:
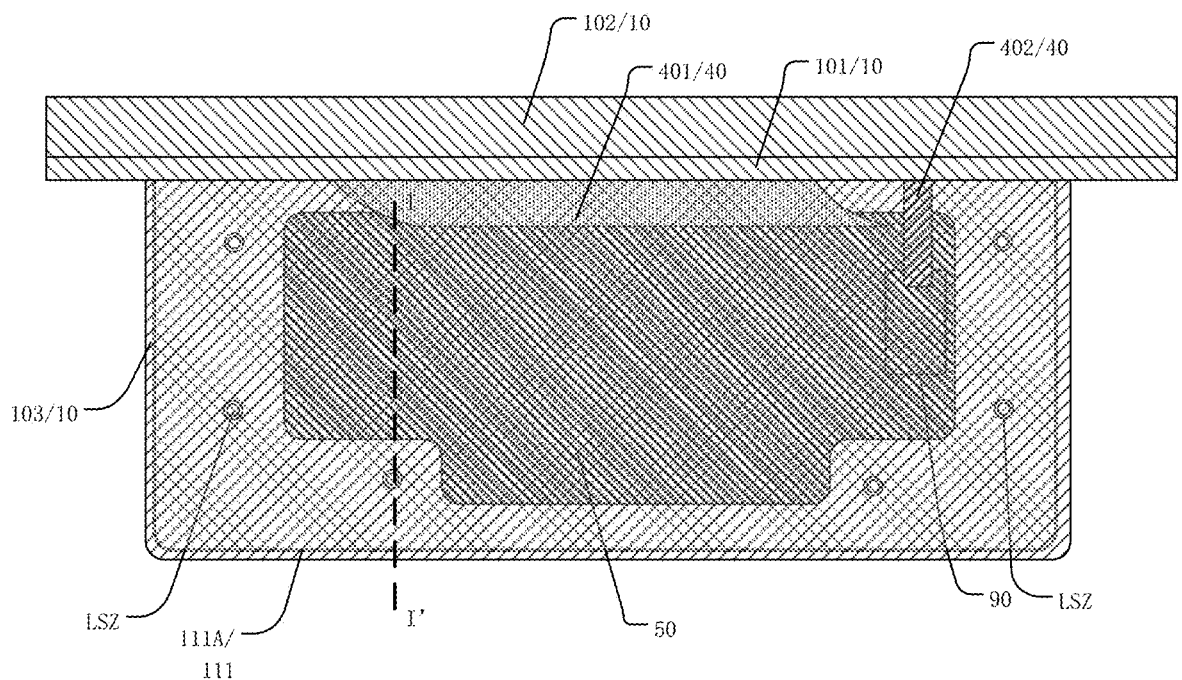
FIG. 30 is another schematic structural side view of the terminal in FIG. 25.
Figure 31:
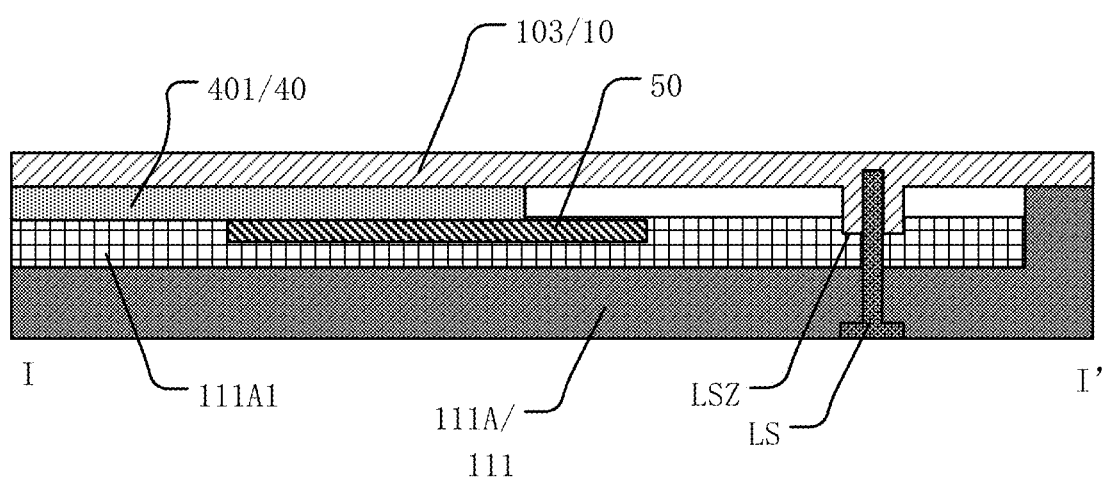
FIG. 31 is a schematic structural diagram of a cross section taken along I-I' in FIG. 30.

In some embodiments, as shown in FIG. 25, FIG. 30, and FIG. 31. FIG. 30 is another schematic structural side view of the terminal in FIG. 25. FIG. 31 is a schematic structural diagram of a cross section taken along I-I' in FIG. 30. (It can be understood that FIG. 30 is filled with transparency to clearly illustrate a structure in this embodiment.) In this embodiment, the terminal 111 may further include a platform 111A. The boss 103 includes a screw post LSZ. The boss 103 is fastened to the platform 111A through the screw post LSZ.

This embodiment explains that a structure of the terminal 111 further includes the platform 111A. The platform 111A is mainly configured to carry the structure of the entire terminal 111. The platform 111A may also play a role of fixedly connecting the terminal 111 to another device. The platform 111A may cover the entire boss 103. The boss 103 of the terminal 111 may be connected and fastened to the platform 111A through the screw post LSZ.

It can be understood that a shape of the platform 111A in this embodiment may be a frame with which all structures (such as the flexible circuit board 40, the driving circuit board 50, and the screw posts LSZ) in the boss 103 are wrapped. Alternatively, the platform 111A may have another shape. This is not limited in this embodiment. When the terminal 111 in this embodiment is an in-vehicle display terminal, the platform 111A may be a carrying mesa structure in a vehicle. In some other embodiments, the platform 111A may alternatively have another shape. This may be specifically designed based on an application scenario of the terminal 111. Details are not described herein in this embodiment. As shown in FIG. 31, when the terminal 111 is fastened to the platform 111A in the vehicle, the boss 103 of the terminal 111 may be fastened to the platform 111A by locking a screw LS in the screw post LSZ.

In some embodiments, the platform 111A in this embodiment may cover at least the driving circuit board, the screw post LSZ, and the like in the boss 103, and shield the driving circuit board, the screw post LSZ, and the like in the boss 103. This helps ensure aesthetics of the entire structure of the terminal 111 after the platform 111A and the display module 000 are assembled, and also ensure overall waterproof and dustproof performance of the terminal 111.

In some embodiments, as shown in FIG. 31, the platform 111A in this embodiment includes a sealing structure 111A1. The sealing structure 111A1 covers at least the driving circuit board 50 and the screw post LSZ in the boss 103. The sealing structure 111A1 may be a material such as a filler having a sealing effect. The sealing structure 111A1 included in the platform 111A can cover the driving circuit board 50 and all screw posts LSZ in the boss 103, to effectively improve waterproof and dustproof performance of the structure of the terminal 111 and ensure a use effect of the terminal 111.

It should be noted that this embodiment merely provides an example of a manner in which the terminal 111 is fixedly connected to another structural device through the platform. In specific implementation, a connection manner includes but is not limited to this, and may alternatively be another connection manner. For details, reference may be made to a specific application scenario of the terminal 111 for disposition. Details are not described herein in this embodiment.

Figure 32:
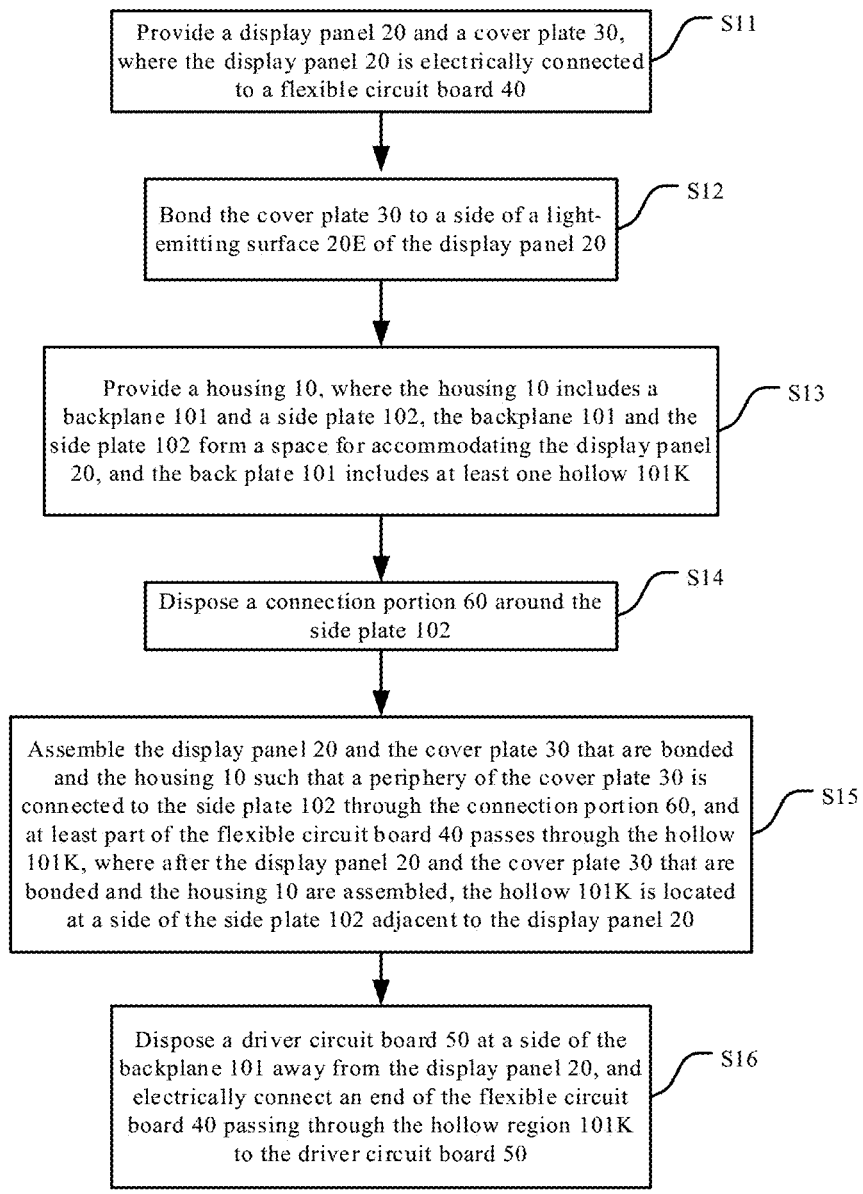
FIG. 32 is a flowchart of a manufacturing method of a display module according to an embodiment of the present disclosure.

In some optional embodiments, as shown in FIG. 1 to FIG. 4 and FIG. 32. FIG. 32 is a flowchart of a manufacturing method of a display module according to an embodiment of the present disclosure. The manufacturing method provided in this embodiment may be used to manufacture the display module 000 in any one of the foregoing embodiments. The manufacturing method includes:

In S11, a display panel 20 and a cover plate 30 are provided. The display panel 20 is electrically connected to a flexible circuit board 40.

Figure 33:
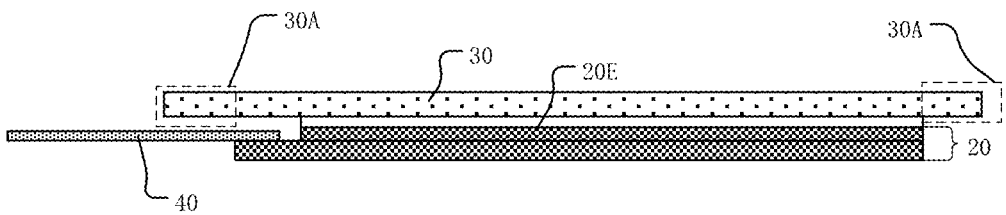
FIG. 33 is a schematic structural diagram after a cover plate is bonded to a display panel in the manufacturing method provided in FIG. 32.

In S12, the cover plate 30 is bonded to a side of a light-emitting surface 20E of the display panel 20, as shown in FIG. 33. FIG. 33 is a schematic structural diagram after a cover plate is bonded to a display panel in the manufacturing method provided in FIG. 32.

In S13, a housing 10 is provided. The housing 10 includes a backplane 101 and a side plate 102. The backplane 101 and the side plate 102 form a space for accommodating the display panel 20. The backplane 101 includes at least one hollow 101K.

Figure 34:
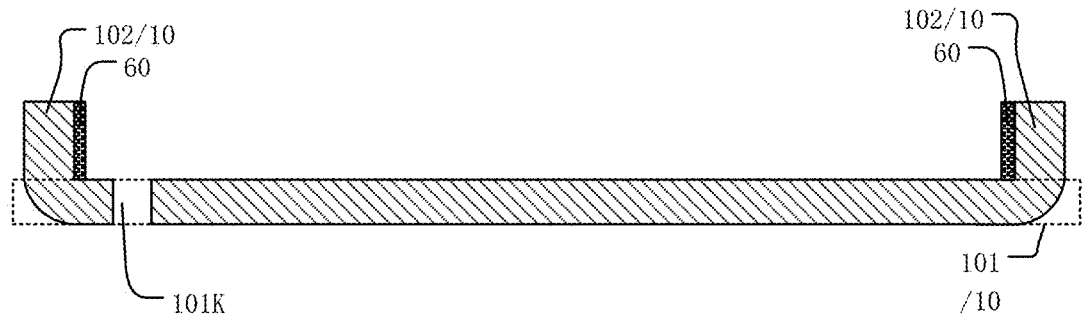
FIG. 34 is a schematic sectional structural view of a housing in the manufacturing method provided in FIG. 32.

In S14, a connection portion 60 is disposed around the side plate 102, as shown in FIG. 34. FIG. 34 is a schematic sectional structural view of a housing in the manufacturing method provided in FIG. 32.

Figure 35:
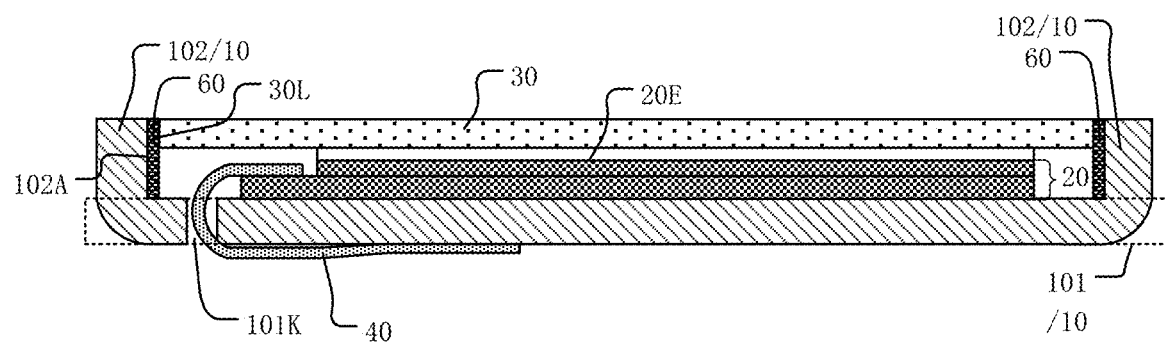
FIG. 35 is a schematic structural diagram after a display panel and a cover plate that are bonded and a housing are assembled in the manufacturing method provided in FIG. 32.

In S15, the display panel 20 and the cover plate 30 that are bonded and the housing 10 are assembled such that a periphery of the cover plate 30 is connected to the side plate 102 through the connection portion 60, and at least a part of the flexible circuit board 40 passes through the hollow 101K. After the display panel 20 and the cover plate 30 that are bonded and the housing 10 are assembled, the hollow 101K is located at a side of the side plate 102 adjacent to the display panel 20. As shown in FIG. 35, FIG. 35 is a schematic structural diagram after a display panel and a cover plate that are bonded and a housing are assembled in the manufacturing method provided in FIG. 32.

Figure 36:
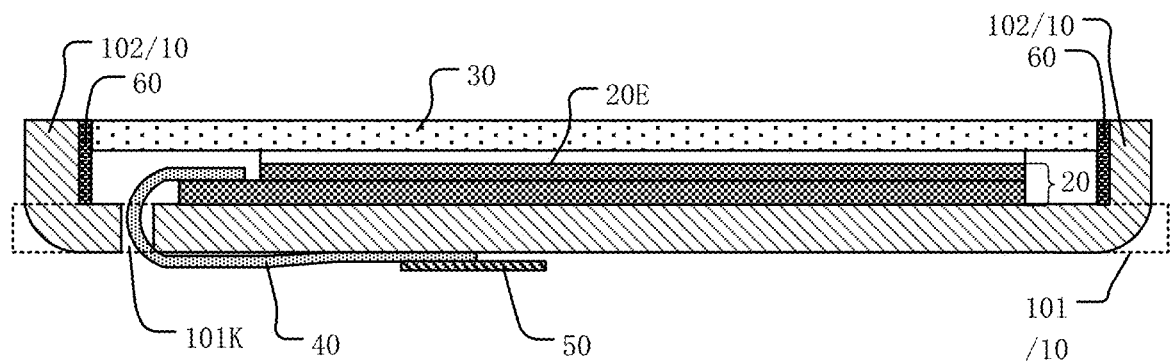
FIG. 36 is a schematic structural diagram of an assembled display module in the manufacturing method provided in FIG. 32.

In S16, a driving circuit board 50 is disposed at a side of the backplane 101 away from the display panel 20, and an end of the flexible circuit board 40 passing through the hollow 101K is electrically connected to the driving circuit board 50, as shown in FIG. 36. FIG. 36 is a schematic structural diagram of an assembled display module in the manufacturing method provided in FIG. 32.

The manufacturing method provided in this embodiment may be used to manufacture the display module 000 shown in FIG. 1 to FIG. 4. First, the manufactured display panel 20 and cover plate 30 are provided. The display panel 20 may be a liquid crystal display panel including a backlight module and a light control panel, an OLED display panel, a micro LED display panel, or a mini LED display panel. The flexible circuit board 40 may be directly bound to a non-display region of the display panel 20 to provide a drive signal for the display panel 20. When the display panel 20 is a liquid crystal display panel including a backlight module and a light control panel, the flexible circuit board 40 may include a flexible circuit board for providing a drive signal for the light control panel and a flexible circuit board for providing a drive signal for the backlight module, which are not shown in the figures of this embodiment. Next, the cover plate 30 configured to protect the display panel 20 is bonded to the side of the light-emitting surface 20E of the display panel 20. In some embodiments, a polarizer may further be included between the display panel 20 and the cover plate 30. The display panel 20 may be bonded and fastened to the cover plate 30 through optical clear adhesive or the like. A size of the cover plate 30 is usually larger than that of the display panel 20, to well protect the entire display panel 20. Then, the housing 10 for accommodating at least the display panel 20 is provided. The housing 10 includes the backplane 101 and the side plate 102. The backplane 101 and the side plate 102 may be integrally formed. The side plate 102 may be disposed around an edge of the backplane 101. The backplane 101 and the side plate 102 are integrally formed to form the space for accommodating the display panel 20. At least one hollow 101K may be provided in the backplane 101. In some embodiments, a shape and size of the hollow 101K may correspond to those of the flexible circuit board 40. In the provided housing 10, the connection portion 60 is disposed around the side plate 102. A structure and material of the connection portion 60 are not limited in this embodiment. The connection portion 60 may be dispensing adhesive, double-sided adhesive, or other adhesive having a sealing and fastening effect. This is not limited in this embodiment. Then, the display panel 20 and the cover plate 30 that are bonded and the housing 10 are assembled such that the periphery of the cover plate 30 is connected to the side plate 102 through the connection portion 60, and at least a part of the flexible circuit board 40 passes through the hollow 101K. After the display panel 20 and the cover plate 30 that are bonded and the housing 10 are assembled, the hollow 101K is located at the side of the side plate 102 adjacent to the display panel 20. Then, the driving circuit board 50 may be disposed at the side of the backplane 101 away from the display panel 20. The end of the flexible circuit board 40 passing through the hollow 101K is electrically connected to the driving circuit board 50. The flexible circuit board 40 may be electrically connected to the driving circuit board 50 directly. Alternatively, the flexible circuit board 40 may be electrically connected through a connection structure such as a connector. This is not limited in this embodiment. In specific implementation, this may be set based on an actual requirement.

In this embodiment, when the display panel 20 and the cover plate 30 that are bonded and the housing 10 are assembled, the cover plate 30 and the display panel 20 may both be located in the space formed by the side plate 102 and the backplane 101. The edge 30L of the cover plate 30 is connected to the side surface 102A of the side plate 102 facing the display panel 20 through the connection portion 60 (as shown in FIG. 2 and FIG. 35). Alternatively, the display panel 20 may be located in the space formed by the side plate 102 and the backplane 101, and the cover plate 30 may be located outside the space formed by the side plate 102 and the backplane 101. The portion of the cover plate 30 beyond the display panel 20 may be connected to the top portion 102B of the side plate 102 through the connection portion 60 (as shown in FIG. 4). This is not limited in this embodiment. In specific implementation, this may be manufactured based on the specific structure of the display module 000.

In the manufacturing method of the display module 000 provided in this embodiment, the backplane 101 of the provided housing 10 includes at least one hollow 101K. The hollow 101K may have a position corresponding to a position of the flexible circuit board 40, and is for the flexible circuit board 40 to pass through. The flexible circuit board 40 passes through the hollow 101K and then is electrically connected to the driving circuit board 50 at the side of the backplane 101 away from the display panel 20, to drive the display panel 20. In addition, when the display panel 20, the cover plate 30, and the housing 10 are assembled, the cover plate 30 is connected to the side plate 102 through the connection portion 60. The connection portion 60 is disposed such that the cover plate 30 and the display panel 20 are wrapped with the side plate 102, to form an enclosed space without a gap around. An integral sealing assembly effect is achieved on an entire surface, to meet overall waterproof and dustproof performance requirements of the display module 000. In the manufacturing method provided in this embodiment, only a design of the housing 10 needs to be improved. A possibility of an assembling gap after module assembly can be reduced by resolving an assembling gap after module assembly in an existing design through improvement. The design of the housing 10 can achieve high sealing performance and good waterproof and dustproof effects. In addition, an assembly process is simple and fast. After the display panel 20 is bonded to the cover plate 30, the flexible circuit board 40 only needs to pass through the hollow 101K of the backplane 101 to be electrically connected to the driving circuit board 50. This can improve assembly efficiency and reduce manufacturing costs.

Figure 37:
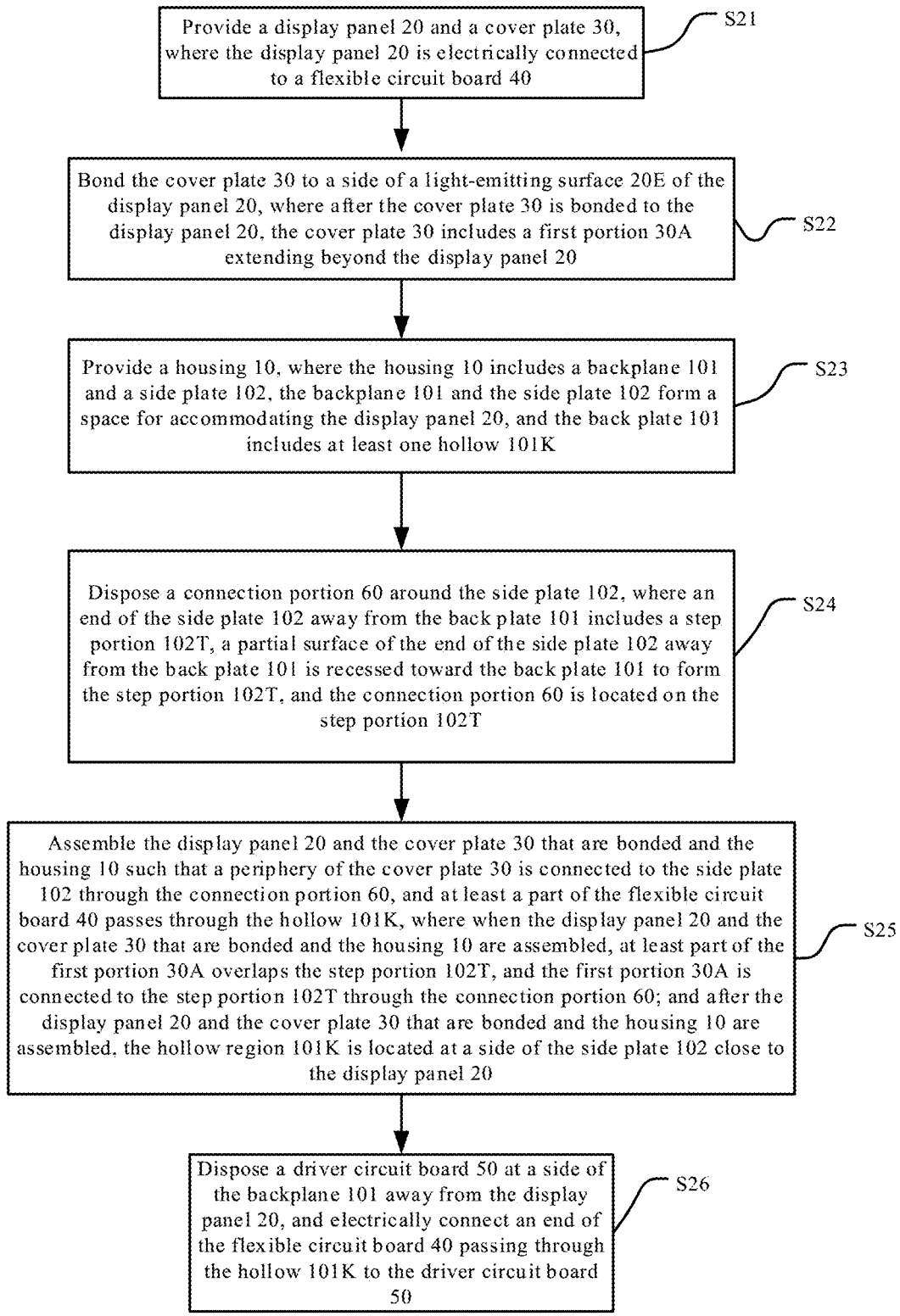
FIG. 37 is another flowchart of a manufacturing method of a display module according to an embodiment of the present disclosure.

In some optional embodiments, as shown in FIG. 7 to FIG. 10, FIG. 33, and FIG. 37. FIG. 37 is another flowchart of a manufacturing method of a display module according to an embodiment of the present disclosure. The manufacturing method provided in this embodiment may be used to manufacture the display module 000 in any one of the foregoing embodiments. The manufacturing method includes:

In S21, a display panel 20 and a cover plate 30 are provided. The display panel 20 is electrically connected to a flexible circuit board 40.

In S22, the cover plate 30 is bonded to a side of a light-emitting surface 20E of the display panel 20. After the cover plate 30 is bonded to the display panel 20, the cover plate 30 includes a first portion 30A extending beyond the display panel 20, as shown in FIG. 33.

In S23, a housing 10 is provided. The housing 10 includes a backplane 101 and a side plate 102. The backplane 101 and the side plate 102 form a space for accommodating the display panel 20. The backplane 101 includes at least one hollow 101K.

Figure 38:
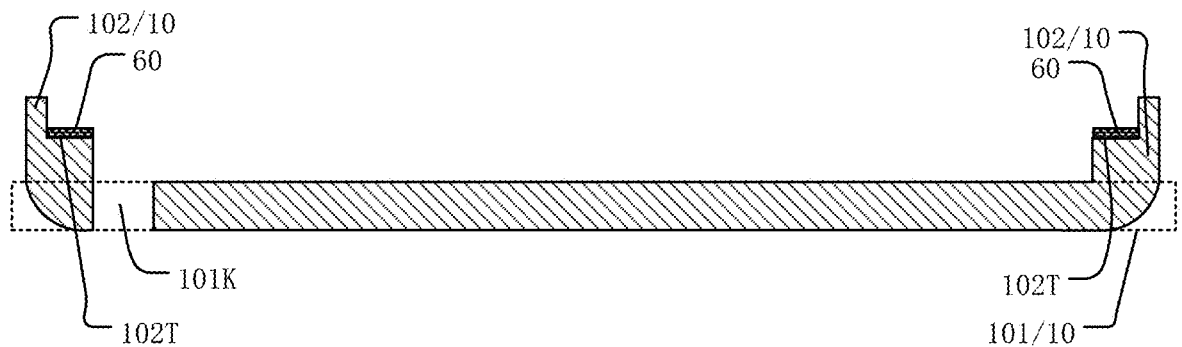
FIG. 38 is a schematic sectional structural view of a housing in the manufacturing method provided in FIG. 37.

In S24, a connection portion 60 is disposed around the side plate 102. An end of the side plate 102 away from the backplane 101 includes a step portion 102T. Part of the surface of the end of the side plate 102 away from the backplane 101 is recessed toward the backplane 101 to form the step portion 102T. The connection portion 60 is located on the step portion 102T. As shown in FIG. 38, FIG. 38 is a schematic sectional structural view of a housing in the manufacturing method provided in FIG. 37.

Figure 39:
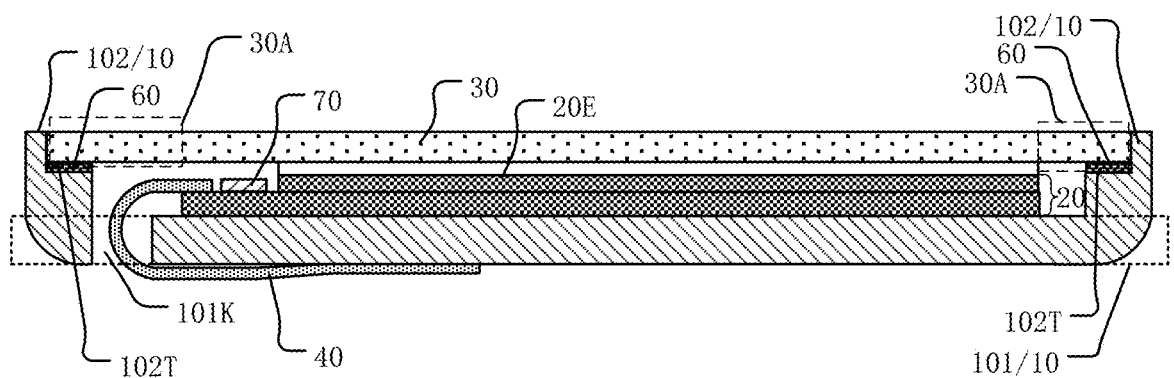
FIG. 39 is a schematic structural diagram after a display panel and a cover plate that are bonded and a housing are assembled in the manufacturing method provided in FIG. 37.

In S25, the display panel 20 and the cover plate 30 that are bonded and the housing 10 are assembled such that a periphery of the cover plate 30 is connected to the side plate 102 through the connection portion 60, and at least a part of the flexible circuit board 40 passes through the hollow 101K. When the display panel 20 and the cover plate 30 that are bonded and the housing 10 are assembled, at least a part of the first portion 30A overlaps the step portion 102T. The first portion 30A is connected to the step portion 102T through the connection portion 60. After the display panel 20 and the cover plate 30 that are bonded and the housing 10 are assembled, the hollow 101K is located at a side of the side plate 102 adjacent to the display panel 20. As shown in FIG. 39, FIG. 39 is a schematic structural diagram after a display panel and a cover plate that are bonded and a housing are assembled in the manufacturing method provided in FIG. 37.

Figure 40:
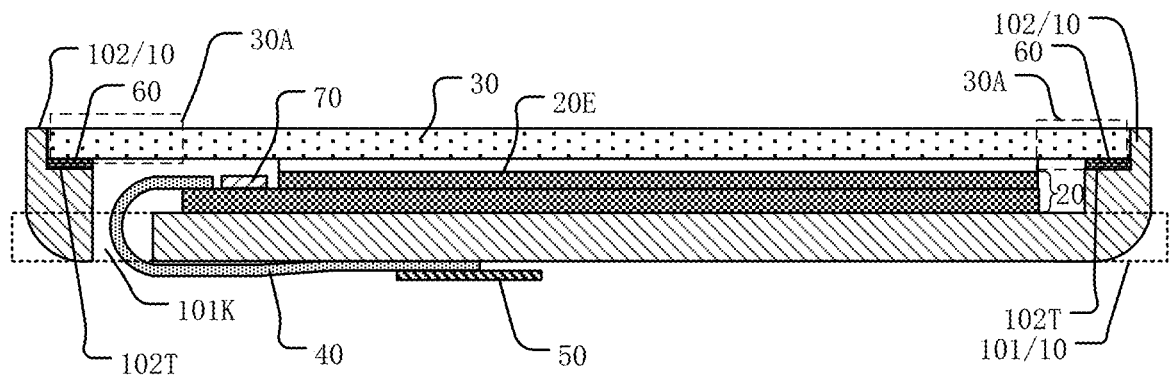
FIG. 40 is a schematic structural diagram of an assembled display module in the manufacturing method provided in FIG. 37.

In S26, a driving circuit board 50 is disposed at a side of the backplane 101 away from the display panel 20, and an end of the flexible circuit board 40 passing through the hollow 101K is electrically connected to the driving circuit board 50, as shown in FIG. 40. FIG. 40 is a schematic structural diagram of an assembled display module in the manufacturing method provided in FIG. 37.

In the manufacturing method provided in this embodiment, after the display panel 20 and the cover plate 30 that are bonded and the housing 10 are assembled, the cover plate 30 and the display panel 20 may both be located in the space formed by the housing 10. The end of the side plate 102 away from the backplane 101 (which may be understood as the top portion of the side plate 102) is provided with the step portion 102T. Part of the surface of the end of the side plate 102 away from the backplane 101 is recessed toward the backplane 101 to form the step portion 102T. This can also be understood as that a partial region of the end of the side plate 102 away from the backplane 101 is hollowed out to form the step portion 102T (as shown in FIG. 38). When the cover plate 30 is connected to the side plate 102, the first portion 30A of the cover plate 30 extending beyond the display panel 20 may be lapped on the step portion 102T of the side plate 102. That is, at least a part of the first portion 30A overlaps the step portion 102T. The step portion 102T can carry and support the cover plate 30. This helps improve stability of the assembled display module. In addition, when the cover plate 30 is connected to the side plate 102, a sealing connection effect between the cover plate 30 and the side plate 102 can be achieved through the connection portion 60 disposed on the step portion 102T. This helps improve overall waterproof and dustproof performance of the assembled display module.

Figure 41:
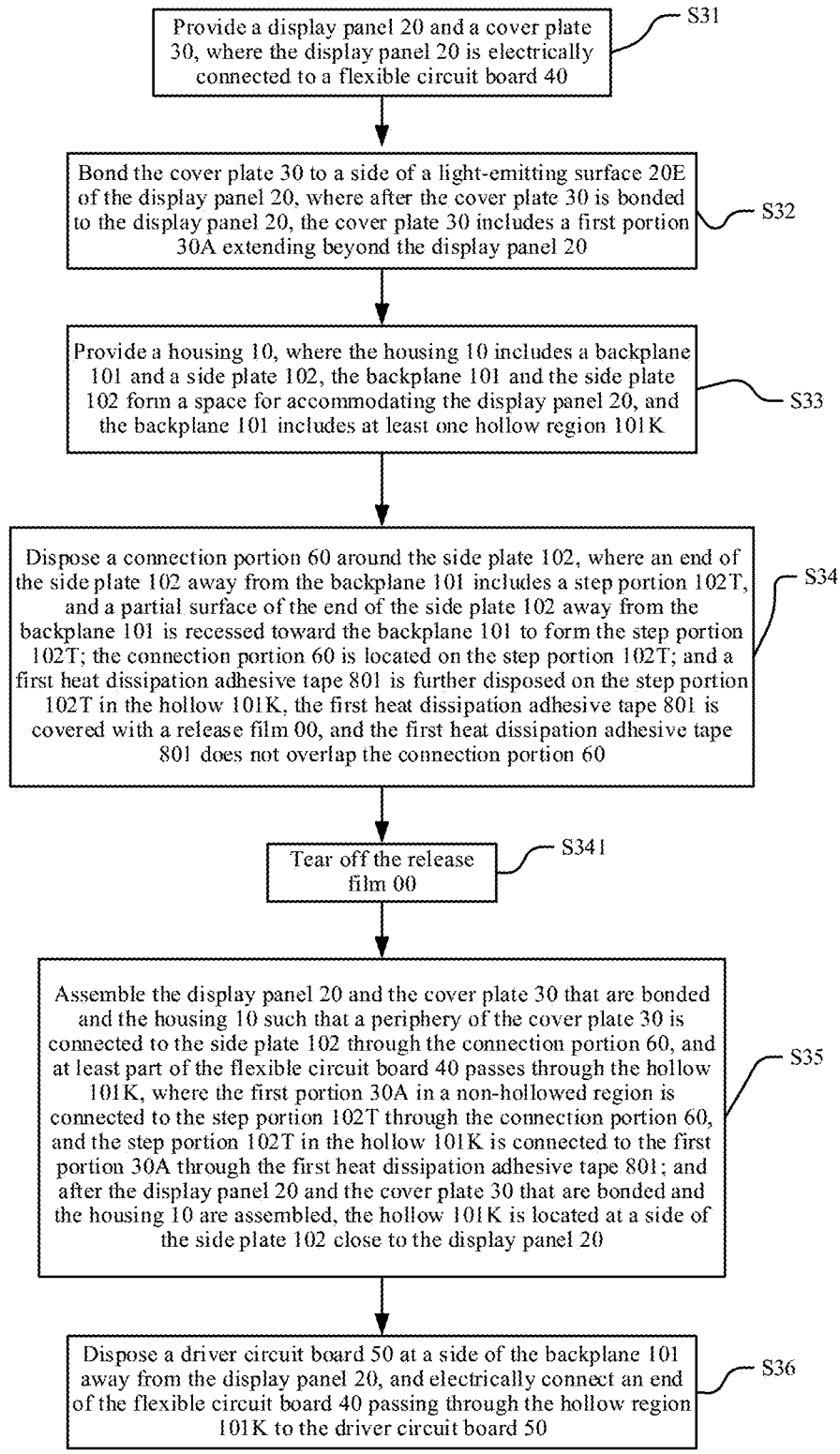
FIG. 41 is another flowchart of a manufacturing method of a display module according to an embodiment of the present disclosure.

In some optional embodiments, as shown in FIG. 11 to FIG. 15, FIG. 33, and FIG. 41. FIG. 41 is another flowchart of a manufacturing method of a display module according to an embodiment of the present disclosure. The manufacturing method provided in this embodiment may be used to manufacture the display module 000 in any one of the foregoing embodiments. The manufacturing method includes:

In S31, a display panel 20 and a cover plate 30 are provided. The display panel 20 is electrically connected to a flexible circuit board 40.

In S32, the cover plate 30 is bonded to a side of a light-emitting surface 20E of the display panel 20. After the cover plate 30 is bonded to the display panel 20, the cover plate 30 includes a first portion 30A extending beyond the display panel 20, as shown in FIG. 33.

In S33, a housing 10 is provided. The housing 10 includes a backplane 101 and a side plate 102. The backplane 101 and the side plate 102 form a space for accommodating the display panel 20. The backplane 101 includes at least one hollow 101K.

Figure 42:
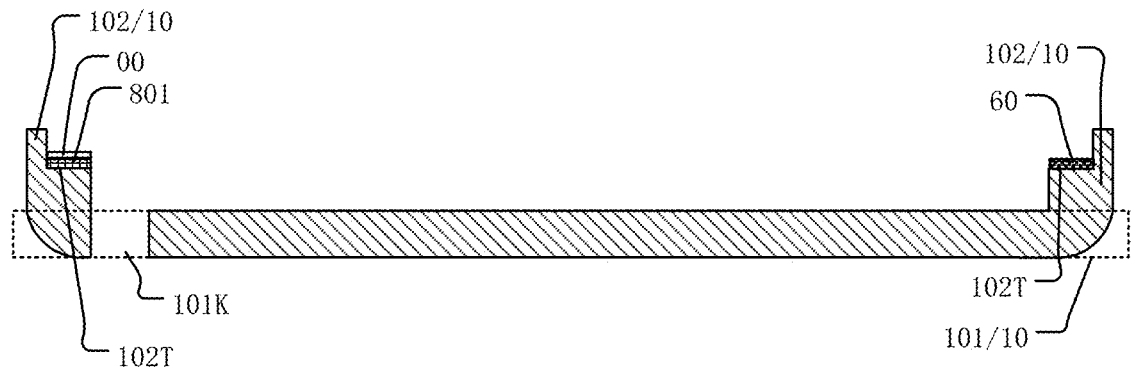
FIG. 42 is a schematic sectional structural view of a housing in the manufacturing method provided in FIG. 41.

In S34, a connection portion 60 is disposed around the side plate 102. An end of the side plate 102 away from the backplane 101 includes a step portion 102T. Part of the surface of the end of the side plate 102 away from the backplane 101 is recessed toward the backplane 101 to form the step portion 102T. The connection portion 60 is located on the step portion 102T. In the provided housing 10, a first heat dissipation adhesive tape 801 is further disposed on the step portion 102T in the hollow 101K. The first heat dissipation adhesive tape 801 is covered with a release film 00 (not filled in the figure). The first heat dissipation adhesive tape 801 does not overlap the connection portion 60. As shown in FIG. 42, FIG. 42 is a schematic sectional structural view of a housing in the manufacturing method provided in FIG. 41.

Figure 43:
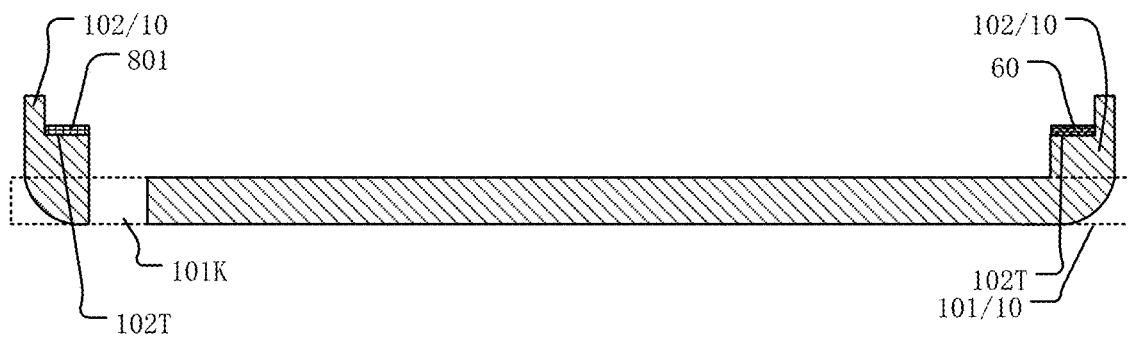
FIG. 43 is a schematic sectional structural view of a housing after a release film on a first heat dissipation adhesive tape is peeled off in the manufacturing method provided in FIG. 41.

S341: The release film 00 is peeled off before the display panel 20 and the cover plate 30 that are bonded and the housing 10 are assembled, as shown in FIG. 13 and FIG. 43. FIG. 43 is a schematic sectional structural view of a housing after a release film on a first heat dissipation adhesive tape is peeled off in the manufacturing method provided in FIG. 41.

Figure 44:
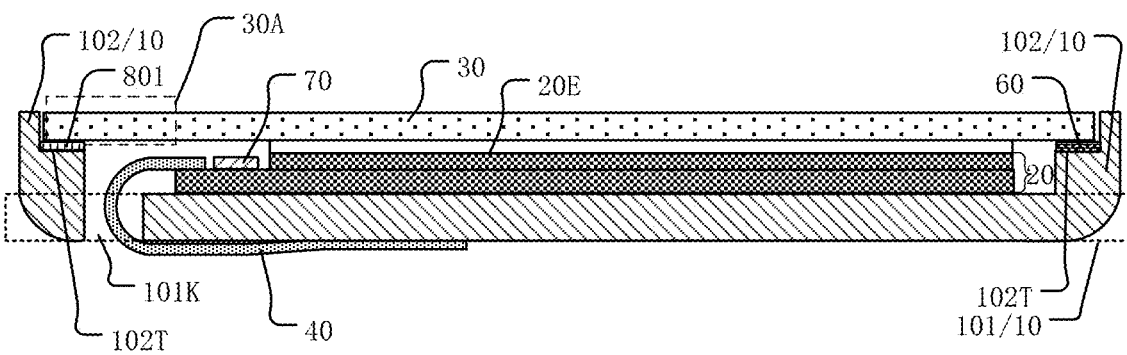
FIG. 44 is a schematic structural diagram after a display panel and a cover plate that are bonded and a housing are assembled in the manufacturing method provided in FIG. 41.

In S35, the display panel 20 and the cover plate 30 that are bonded and the housing 10 are assembled such that a periphery of the cover plate 30 is connected to the side plate 102 through the connection portion 60, and at least a part of the flexible circuit board 40 passes through the hollow 101K. When the display panel 20 and the cover plate 30 that are bonded and the housing 10 are assembled, at least a part of the first portion 30A overlaps the step portion 102T. The first portion 30A in a non-hollowed region is connected to the step portion 102T through the connection portion 60. The step portion 102T in the hollow 101K is connected to the first portion 30A through the first heat dissipation adhesive tape 801. After the display panel 20 and the cover plate 30 that are bonded and the housing 10 are assembled, the hollow 101K is located at a side of the side plate 102 adjacent to the display panel 20. As shown in FIG. 44, FIG. 44 is a schematic structural diagram after a display panel and a cover plate that are bonded and a housing are assembled in the manufacturing method provided in FIG. 41.

Figure 45:
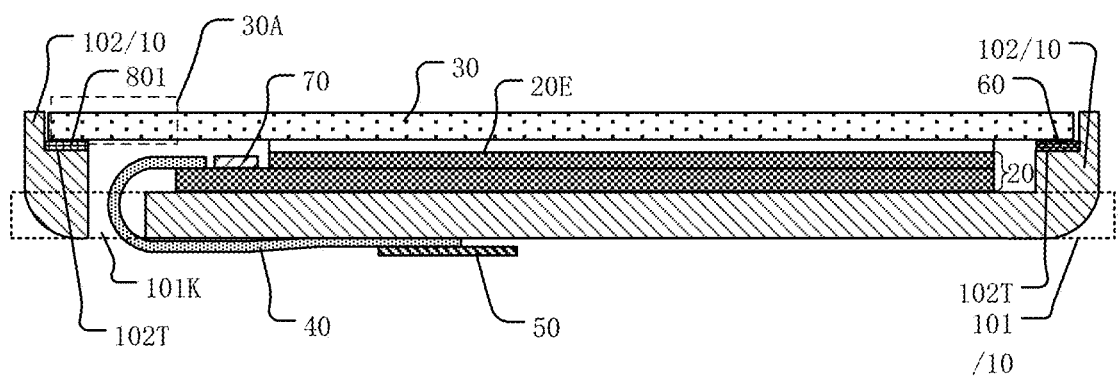
FIG. 45 is a schematic structural diagram of an assembled display module in the manufacturing method provided in FIG. 41.

In S36, a driving circuit board 50 is disposed at a side of the backplane 101 away from the display panel 20, and an end of the flexible circuit board 40 passing through the hollow 101K is electrically connected to the driving circuit board 50, as shown in FIG. 45. FIG. 45 is a schematic structural diagram of an assembled display module in the manufacturing method provided in FIG. 41.

In the manufacturing method provided in this embodiment, when the housing 10 is provided, the first heat dissipation adhesive tape 801 is attached to a partial region of the step portion 102T of the side plate 102. During use of the display module, a specific position is prone to an extremely high temperature. For example, the display panel 20 is a liquid crystal display panel. The first circuit board 70 is bound to the non-display region NA of the display panel 20. In the display module 000, the flexible circuit board 40 is electrically connected to the display panel 20, for example, through the first circuit board 70. Main heat sources of the display module are LEDs in the backlight source and the first circuit board 70 bound to the non-display region NA of the display panel 20. The backlight module including the backlight source is usually located at a side of the display panel 20 adjacent to the backplane 101. A part of heat generated by the backlight module is diffused toward the cover plate 30. A position of the first circuit board 70 is a region where heat is concentrated. Therefore, a temperature in the vicinity of the hollow 101K, at the position of the first circuit board 70, and at a position of the electrical connection between the flexible circuit board 40 and the first circuit board 70 and in the vicinity thereof is higher than that at another position. The temperature continuously spreads to both sides, affecting a display effect. In the prior art, generated heat can be reduced only by reducing power consumption and driving performance. Therefore, when the display module 000 is manufactured in this embodiment, the manufactured housing 10 has a structure in which the first heat dissipation adhesive tape 801 is disposed at least at the side of the step portion 102T facing the first portion 30A in the hollow 101K. Before the cover plate 30 and the housing 10 are assembled, the release film 00 is adhered to the first heat dissipation adhesive tape 801 to protect adhesion of the first heat dissipation adhesive tape 801. When the first heat dissipation adhesive tape 801 is disposed on the step portion 102T in the hollow 101K, the connection portion 60 may not be disposed in the region. That is, the first heat dissipation adhesive tape 801 and the connection portion 60 do not overlap within the range of the step portion 102T. This means that the connection portion 60 may not be disposed on the step portion 102T in the hollow 101K. Because the first heat dissipation adhesive tape 801 features adhesion and heat dissipation, disposing the first heat dissipation adhesive tape 801 on the step portion 102T in the hollow 101K can also connect and fasten the cover plate 30 to the side plate 102. This can avoid that the connection portion 60 coated with an adhesive layer or the like on the step portion 102T in the hollow 101K affects heat dissipation performance of the region. The release film 00 is peeled off before the display panel 20 and the cover plate 30 that are bonded and the housing 10 are assembled. When the display panel 20 and the cover plate 30 that are bonded and the housing 10 are assembled, the first portion 30A in the non-hollowed region is connected to the step portion 102T through the connection portion 60. The step portion 102T in the hollow 101K is connected to the first portion 30A through the first heat dissipation adhesive tape 801. During use of the display module 000 manufactured through the manufacturing method in this embodiment, heat that may be generated in the vicinity of the hollow 101K, at the position of the first circuit board 70, and at the position of the electrical connection between the flexible circuit board 40 and the first circuit board 70 and in the vicinity thereof can be conducted to a position of the first heat dissipation adhesive tape 801 through the low-temperature first portion 30A of the cover plate 30, and guided to the side plate 102 of the housing 10 through the first heat dissipation adhesive tape 801. Because the side plate 102 of the housing 10 has a large contact area with the air, the heat can be rapidly conducted to the air, to achieve rapid and effective heat dissipation and ensure display quality of the manufactured display module during use.

In some embodiments, in the manufacturing method provided in this embodiment, when the display panel 20 and the cover plate 30 that are bonded and the housing 10 are assembled, a position of the hollow 101K corresponds to that of the flexible circuit board 40 by aligning shapes of the housing 10 and the display panel 20. No alignment marks need to be made for the display panel 20, the cover plate 30, and the housing 10. The position of the hollow 101K of the housing 10 can correspond to that of the flexible circuit board 40 electrically connected to the display panel 20 only by aligning the shapes of the housing 10 and the display panel 20. Positioning and assembly can be performed by grasping a shape of a product. This helps reduce difficulty in manufacturing the display module and improve process efficiency.

In some embodiments, in the manufacturing method provided in this embodiment, bonding and pressure maintaining may be performed after the display panel 20 and the cover plate 30 that are bonded and the housing 10 are assembled. The display panel 20 and the cover plate 30 that are bonded and the housing 10 may be pressed with specific pressure. This can ensure connection reliability of the entire display module after assembly and helps improve a service life of the display module and a product yield.

It should be noted that in the manufacturing method provided in this embodiment, a process of manufacturing the display panel 20 is not described in detail. In specific implementation, it can be understood by referring to a manufacturing method of a display panel in the related art based on a type of the display panel 20.

It can be learned from the foregoing embodiments that the display module, the manufacturing method of a display module, and the terminal provided in the present disclosure achieve at least the following beneficial effects:

The display module provided in the present disclosure includes the housing, the display panel located in the housing, and the cover plate located at the side of the light-emitting surface of the display panel. The cover plate is configured to well protect the entire display panel. The backplane and the side plate of the housing form the space for accommodating at least the display panel. The display module includes at least one flexible circuit board. The display panel is driven through a drive signal provided by the flexible circuit board. In the present disclosure, the backplane includes at least one hollow. The hollow is located at the side of the side plate adjacent to the display panel. The hollow may have a position corresponding to the position of the flexible circuit board, and is for the flexible circuit board to pass through. The flexible circuit board passes through the hollow and then is electrically connected to the driving circuit board at the side of the backplane away from the display panel, to drive the display panel. A design is improved for the display module provided in the present disclosure to resolve a problem that an assembling gap exists after module assembly in an existing design. The hollow is provided only at a position through which the flexible circuit board needs to pass. The side plate is disposed around the backplane of the housing to serve as a retaining wall. The backplane and the side plate jointly carry the display panel. This can reduce a possibility of an assembling gap after module assembly. In addition, the cover plate is connected to the side plate through the connection portion in the present disclosure. The connection portion is disposed such that the cover plate and the display panel are wrapped with the side plate, to form an enclosed space without a gap around. An integral sealing assembly effect is achieved on an entire surface, to meet overall waterproof and dustproof performance requirements of the display module. A design of the housing in the present disclosure can achieve high sealing performance and good waterproof and dustproof effects. In addition, an assembly process is simple and fast. After the display panel is bonded to the cover plate, the flexible circuit board only needs to pass through the hollow of the backplane to be electrically connected to the driving circuit board. This can improve assembly efficiency and reduce manufacturing costs.

Although some specific embodiments of the present disclosure have been described in detail by way of example, those skilled in the art should understand that the foregoing examples are merely for illustration, and are not intended to limit the scope of the present disclosure. Those skilled in the art should understand that modifications may be made to the foregoing embodiments without departing from the scope and spirit of the present disclosure. The scope of the present disclosure is defined by the appended claims.

What is claimed is:

1. A display module, comprising a housing, a display panel located in the housing, and a cover plate located at a side of a light-emitting surface of the display panel, wherein the housing comprises a backplane and a side plate, and the backplane and the side plate define a space for accommodating the display panel;
   at least one flexible circuit board having an end electrically connected to the display panel; and
   a driving circuit board located at a side of the backplane away from the display panel;
   wherein the backplane comprises at least one hollow located at a side of the side plate adjacent to the display panel; and
   wherein the flexible circuit board passes through the at least one hollow and is electrically connected to the driving circuit board; and the cover plate is connected to the side plate through a connection portion.

2. The display module according to claim 1, wherein the backplane and the side plate are integrally formed.

3. The display module according to claim 1, wherein
   the flexible circuit board is electrically connected to the display panel through a first circuit board, and the first circuit board is located in a non-display region of the display panel; and
   an orthographic projection of the at least one hollow on a plane of the display panel is located between an orthographic projection of the side plate on the plane of the display panel and an orthographic projection of the first circuit board on the plane of the display panel.

4. The display module according to claim 1, wherein
an end of the side plate away from the backplane comprises a step portion, and the cover plate comprises a first portion extending beyond the display panel; and
at least part of the first portion overlaps the step portion.

5. The display module according to claim 4, wherein
a width of the step portion is greater than or equal to 1.8 mm in a direction from the side plate to the display panel.

6. The display module according to claim 4, wherein
the connection portion comprises an adhesive layer coated on the step portion, and the first portion is connected to the step portion through the adhesive layer.

7. The display module according to claim 6, wherein
a width of the step portion is greater than or equal to a width of the adhesive layer in a direction from the side plate to the display panel; or
wherein a width of the adhesive layer is greater than or equal to 1 mm in a direction from the side plate to the display panel.

8. The display module according to claim 4, wherein
a first heat dissipation adhesive tape is provided at a side of the step portion facing the first portion in the at least one hollow.

9. The display module according to claim 8, wherein
a width of the first heat dissipation adhesive tape is greater than or equal to 1.5 mm in a direction from the side plate to the display panel.

10. The display module according to claim 8, wherein
the flexible circuit board is electrically connected to the display panel through a first circuit board, and the first circuit board is located in a non-display region of the display panel;
a second heat dissipation adhesive tape is disposed on a side surface of the first circuit board facing the cover plate; and/or
a third heat dissipation adhesive tape is disposed on a side surface of the first circuit board facing the backplane.

11. The display module according to claim 4, wherein
the side plate comprises a first side plate and a second side plate, and the first side plate is located at a side of the backplane adjacent to the hollow;
the step portion comprised in the first side plate is a first step portion, and the step portion comprised in the second side plate is a second step portion; and
a width of the first step portion is greater than a width of the second step portion in a direction from the side plate to the display panel.

12. The display module according to claim 4, wherein
a distance from the step portion to the backplane is greater than a distance from the light-emitting surface of the display panel to the backplane in a direction perpendicular to a plane of the display panel; or wherein
a thickness of the side plate is greater than a width of the step portion in a direction from the side plate to the display panel.

13. The display module according to claim 1, wherein
a width of the at least one hollow is greater than or equal to 2 mm in a direction from the side plate to the display panel; or wherein a first gap is set between an edge of the cover plate and the side plate, and a width of the first gap is greater than or equal to 0.3 mm.

14. The display module according to claim 1, wherein
the display panel comprises a backlight module and a light control panel, and the backlight module is located at a side of the light control panel away from the cover plate;
the backlight module comprises a backlight source and a plurality of optical films, the backlight source is electrically connected to a light source drive unit, and the light source drive unit is disposed at a side of the backplane away from the backlight module;
the flexible circuit board comprises a first flexible circuit board electrically connected to the light control panel and a second flexible circuit board electrically connected to the backlight source; and
the at least one hollow comprises a first hollow corresponding to the first flexible circuit board and a second hollow corresponding to the second flexible circuit board, the first flexible circuit board passes through the first hollow, and the second flexible circuit board passes through the second hollow.

15. The display module according to claim 14, wherein
the backplane comprises a middle region and a peripheral region disposed around the middle region, and the peripheral region is located at a side of the middle region adjacent to the side plate; and
the second hollow is located in the middle region and located at a side of the first hollow away from the side plate.

16. The display module according to claim 1, wherein
N hollows are provided, the display panel is electrically connected to N flexible circuit boards, and the N flexible circuit boards are in a one-to-one correspondence with the N hollows, where N is a positive integer; or wherein one hollow is provided, and the display panel is electrically connected to M flexible circuit boards, and the M flexible circuit boards correspond to the one hollow, where M is an integer greater than 2.

17. A device, comprising a display module, wherein
the display module comprises a housing, a display panel located in the housing, and a cover plate located at a side of a light-emitting surface of the display panel, wherein the housing comprises a backplane and a side plate, and the backplane and the side plate define a space for accommodating the display panel;
at least one flexible circuit board having an end electrically connected to the display panel; and
a driving circuit board located at a side of the backplane away from the display panel;
wherein the backplane comprises at least one hollow located at a side of the side plate adjacent to the display panel; and
wherein the flexible circuit board passes through the at least one hollow and is electrically connected to the driving circuit board; and the cover plate is connected to the side plate through a connection portion.

18. The device according to claim 17, wherein
the backplane further comprises a plurality of screw posts that do not overlap the driving circuit board.

19. The device according to claim 18, wherein
the device comprises a platform, and the side of the backplane away from the display panel is fastened to the platform through the plurality of screw posts; and
wherein the platform comprises a sealing structure, and the sealing structure covers the driving circuit board and the plurality of screw posts.

20. The device according to claim 17, wherein
the housing further comprises a boss protruding from the backplane, and the driving circuit board is located in the boss; and wherein
the device comprises a platform, the boss comprises a screw post, and the boss is fastened to the platform through the plurality of screw post.

\* \* \* \* \*